(12) United States Patent
Hughes et al.

(10) Patent No.: US 11,941,394 B2
(45) Date of Patent: Mar. 26, 2024

(54) DATA ELEMENT REARRANGEMENT, PROCESSORS, METHODS, SYSTEMS, AND INSTRUCTIONS

(71) Applicant: Intel Corporation, Santa Clara, CA (US)

(72) Inventors: Christopher J. Hughes, Santa Clara, CA (US); Jong Soo Park, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 144 days.

(21) Appl. No.: 16/708,399

(22) Filed: Dec. 9, 2019

(65) Prior Publication Data

US 2020/0117451 A1    Apr. 16, 2020

Related U.S. Application Data

(63) Continuation of application No. 14/865,696, filed on Sep. 25, 2015, now Pat. No. 10,503,502.

(51) Int. Cl.
*G06F 9/30* (2018.01)

(52) U.S. Cl.
CPC ...... *G06F 9/30007* (2013.01); *G06F 9/30032* (2013.01); *G06F 9/30036* (2013.01);
(Continued)

(58) Field of Classification Search
None
See application file for complete search history.

(56) References Cited

U.S. PATENT DOCUMENTS

| | | | |
|---|---|---|---|
| 5,511,210 A | * | 4/1996 | Nishikawa .......... G06F 15/8084 712/2 |
| 6,018,628 A | * | 1/2000 | Stoutamire ............. G06F 8/437 717/118 |

(Continued)

FOREIGN PATENT DOCUMENTS

| | | |
|---|---|---|
| CN | 1174353 A | 2/1998 |
| CN | 103562855 A | 2/2014 |

(Continued)

OTHER PUBLICATIONS

Notice of Allowance, TW App. No. 105126628, dated Jun. 20, 2020, 3 pages (1 page of English Translation and 2 pages of Original Document).

(Continued)

*Primary Examiner* — John M Lindlof
(74) *Attorney, Agent, or Firm* — Nicholson De Vos Webster & Elliott LLP

(57) ABSTRACT

A processor includes a decode unit to decode an instruction indicating a source packed data operand having source data elements and indicating a destination storage location. Each of the source data elements has a source data element value and a source data element position. An execution unit, in response to the instruction, stores a result packed data operand having result data elements each having a result data element value and a result data element position. Each result data element value is one of: (1) equal to a source data element position of a source data element, closest to one end of the source operand, having a source data element value equal to the result data element position of the result data element; and (2) a replacement value, when no source data element has a source data element value equal to the result data element position of the result data element.

20 Claims, 25 Drawing Sheets

(52) U.S. Cl.
CPC ........ *G06F 9/30101* (2013.01); *G06F 9/3016* (2013.01); *G06F 9/30192* (2013.01)

(56) References Cited

U.S. PATENT DOCUMENTS

| | | | |
|---|---|---|---|
| 6,041,404 | A | 3/2000 | Roussel et al. |
| 6,088,782 | A | 7/2000 | Lee et al. |
| 7,984,273 | B2 | 7/2011 | Sprangle et al. |
| 8,074,026 | B2 | 12/2011 | Kim et al. |
| 8,230,172 | B2 | 7/2012 | Hughes et al. |
| 8,447,962 | B2 | 5/2013 | Hughes et al. |
| 8,688,959 | B2 | 4/2014 | Macy et al. |
| 2002/0091910 | A1 | 7/2002 | Yung |
| 2004/0236920 | A1 | 11/2004 | Sheaffer |
| 2006/0026398 | A1 | 2/2006 | Cabillic et al. |
| 2012/0144089 | A1 | 6/2012 | Hall et al. |
| 2013/0275729 | A1 | 10/2013 | Abraham et al. |
| 2013/0283019 | A1 | 10/2013 | Ould-Ahmed-Vall et al. |
| 2014/0019715 | A1 | 1/2014 | Ould-Ahmed-Vall et al. |
| 2014/0040604 | A1* | 2/2014 | Ould-Ahmed-Vall ............ G06F 9/30036 712/225 |
| 2014/0095779 | A1* | 4/2014 | Forsyth ............... G06F 9/3838 711/105 |
| 2014/0095831 | A1* | 4/2014 | Grochowski ....... G06F 9/30043 712/205 |
| 2014/0108769 | A1* | 4/2014 | Jha ..................... G06F 9/30098 712/205 |
| 2014/0149713 | A1* | 5/2014 | Jha ..................... G06F 9/30032 712/4 |
| 2014/0181464 | A1 | 6/2014 | Forsyth et al. |
| 2015/0074373 | A1 | 3/2015 | Sperber et al. |

FOREIGN PATENT DOCUMENTS

| | | |
|---|---|---|
| CN | 104011673 A | 8/2014 |
| CN | 104025040 A | 9/2014 |
| CN | 104040484 A | 9/2014 |
| CN | 104049954 A | 9/2014 |
| CN | 104137059 A | 11/2014 |
| TW | 201523437 A | 6/2015 |
| TW | 201525856 A | 7/2015 |
| WO | 2013/048368 A1 | 4/2013 |
| WO | 2017/052812 A1 | 3/2017 |

OTHER PUBLICATIONS

Office Action, TW App. No. 105126628, dated Mar. 25, 2020, 29 pages (16 pages of English Translation and 13 pages of Original Document).
Intel, "Intel 64 and IA-32 Architectures Software Developer's Manual", vol. 1: Basic Architecture, Order No. 253665-040US, Oct. 2011, 548 pages.
Intel, "Intel 64 and IA-32 Architectures Software Developer's Manual", vol. 2 (2A, 2B & 2C): Instruction Set Reference, A-Z, Order No. 325383-040US, Oct. 2011, 1721 pages.
Intel, "Intel 64 and IA-32 Architectures Software Developer's Manual", vol. 3 (3A, 3B & 3C): System Programming Guide, Order No. 325384-040US, Oct. 2011, 1916 pages.
Intel, "Intel Advanced Vector Extensions Programming Reference", Jun. 2011, 595 pages.
Intel, "Intel Architecture Instruction Set Extensions Programming Reference", Reference No. 319433-017, Dec. 2013, 6 pages.
International Search Report and Written Opinion received for PCT Application No. PCT/US2016/045989, dated Nov. 9, 2016, 14 pages.
International Preliminary Report on Patentability for Application No. PCT/US2016/045989, dated Apr. 5, 2018 ,10 pages.
Notice on Grant of Patent Right for Invention, CN App. No. 201680048981.4, dated Mar. 29, 2022, 6 pages (2 pages of English Translation and 4 pages of Original Document).
Office Action, CN App. No. 201680048981.4, dated Oct. 27, 2021, 19 pages of Original Document Only.
Stepanov et al., "SIMD-based decoding of posting lists", CIKM '11: Proceedings of the 20th ACM international conference on Information and knowledge management, Oct. 2011, pp. 317-326.

* cited by examiner

FIG. 6

METHOD OF PERFORMING
SCATTER BY INDICES
TO REGISTER
INSTRUCTION
660

RECEIVE SCATTER BY INDICES TO REGISTER INSTRUCTION INDICATING SOURCE PACKED DATA OPERAND HAVING SOURCE DATA ELEMENTS, INDICATING SOURCE PACKED INDICES OPERAND HAVING INDICES, AND INDICATING DESTINATION PACKED DATA REGISTER, WHERE EACH OF INDICES CORRESPONDS TO DIFFERENT ONE OF SOURCE DATA ELEMENTS IN SAME RELATIVE POSITION — 661

STORE RESULT PACKED DATA OPERAND IN DESTINATION PACKED DATA REGISTER IN RESPONSE TO INSTRUCTION, RESULT PACKED DATA OPERAND INCLUDING RESULT DATA ELEMENTS, WHERE EACH RESULT DATA ELEMENT HAS VALUE OF ONE OF SOURCE DATA ELEMENTS WHOSE CORRESPONDING INDEX INDICATES DATA ELEMENT POSITION OF RESULT DATA ELEMENT IN RESULT PACKED DATA OPERAND RESULT PACKED DATA OPERAND — 662

METHOD IN PROCESSOR OF
PERFORMING SCATTER BY
INDICES TO REGISTER ROUTINE
1180

RECEIVE SCATTER INDICES TO GATHER INDICES REARRANGEMENT
INSTRUCTION INDICATING FIRST PACKED DATA REGISTER AS SOURCE
PACKED INDICES OPERAND HAVING INDICES ARRANGED IN SCATTER
PATTERN, INDICATING SECOND PACKED DATA REGISTER AS
DESTINATION OPERAND, AND OPTIONALLY INDICATING MASK REGISTER
AS DESTINATION OPERAND — 1181

STORE RESULT PACKED INDICES OPERAND IN SECOND PACKED DATA
REGISTER, AND OPTIONALLY STORE RESULT MASK OPERAND IN MASK
REGISTER, IN RESPONSE TO SCATTER INDICES TO GATHER INDICES
REARRANGEMENT INSTRUCTION, RESULT PACKED INDICES OPERAND
HAVING INDICES ARRANGED IN GATHER PATTERN, OPTIONAL RESULT
MASK OPERAND INDICATING VACANCIES — 1182

RECEIVE GATHER BY INDICES TO REGISTER INSTRUCTION INDICATING
THIRD PACKED DATA REGISTER AS A SOURCE PACKED DATA OPERAND,
INDICATING SECOND PACKED DATA REGISTER AS A SOURCE PACKED
INDICES OPERAND WITH THE INDICES ARRANGED IN THE GATHER
PATTERN, OPTIONALLY INDICATING MASK REGISTER AS A SOURCE MASK
OPERAND, AND INDICATING FOURTH PACKED DATA REGISTER AS A
DESTINATION OPERAND — 1183

STORE RESULT PACKED DATA OPERAND IN FOURTH PACKED DATA
REGISTER IN RESPONSE TO GATHER BY INDICES TO REGISTER
INSTRUCTION, RESULT PACKED DATA OPERAND HAVING DATA ELEENTS
GATHERED FROM THIRD PACKED DATA REGISTER USING INDICES FROM
SECOND PACKED DATA REGISTER SUBJECT OPTIONALLY SUBJECT TO
MASKING BY OPTIONAL SOURCE MASK OPERAND — 1184

FIG. 11

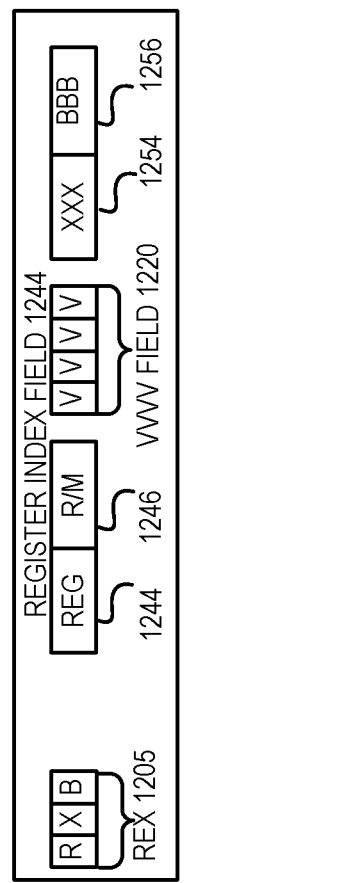
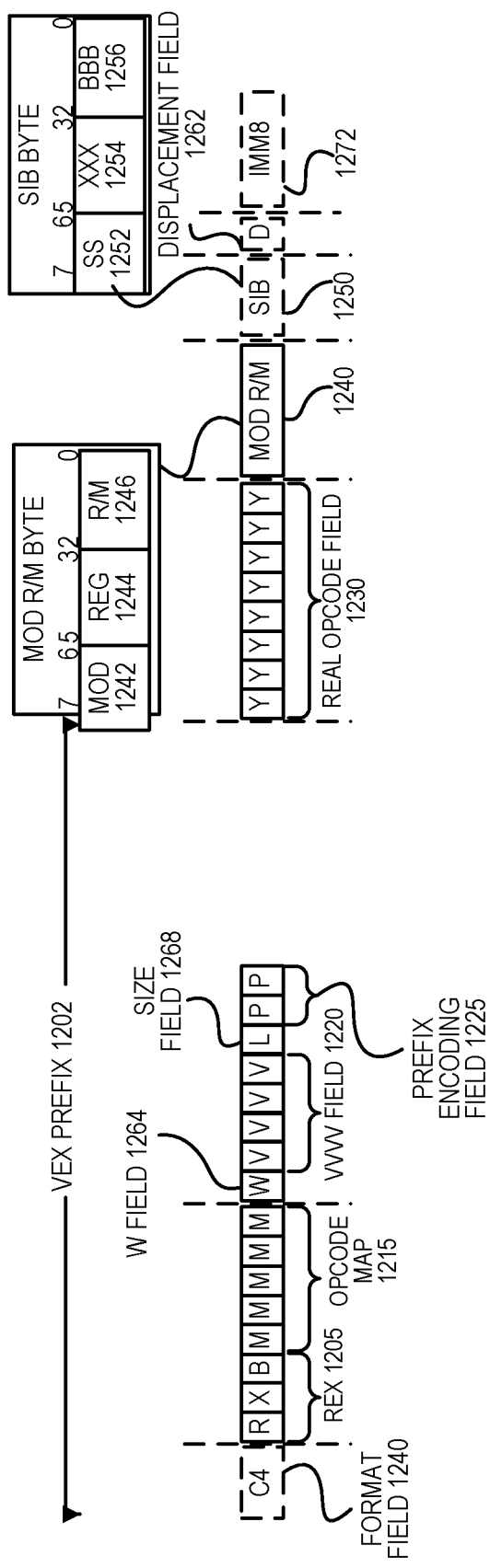
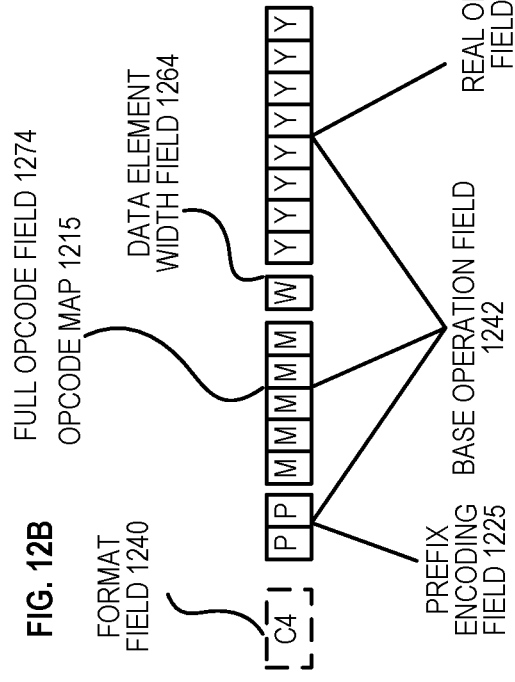
FIG. 12A
FIG. 12B
FIG. 12C

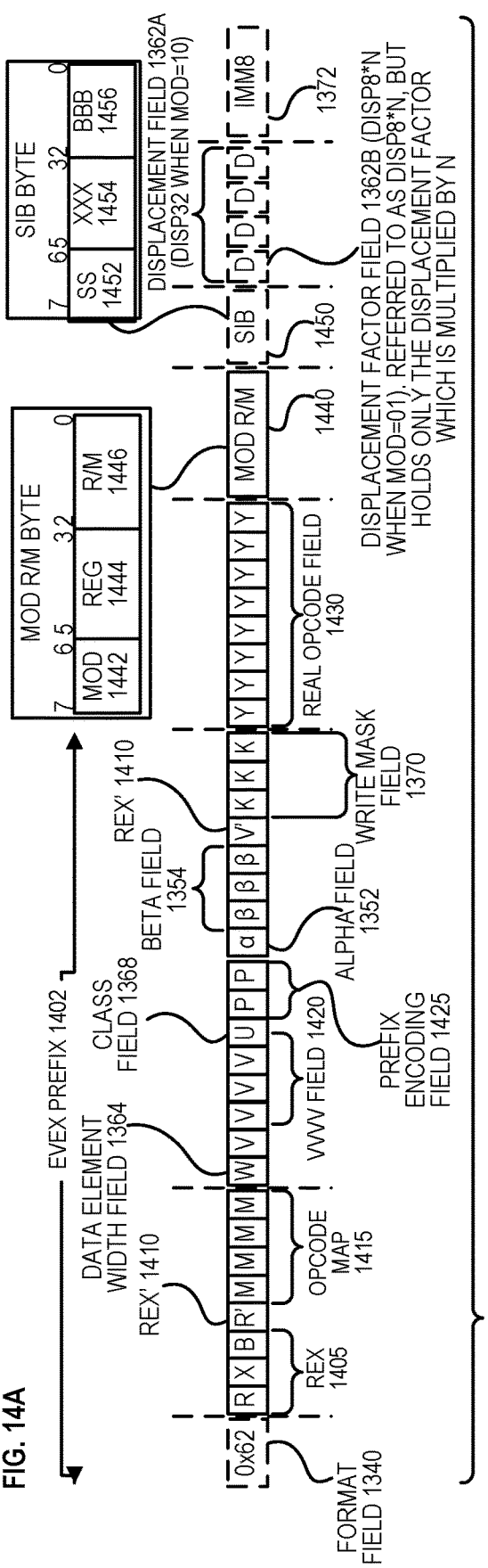
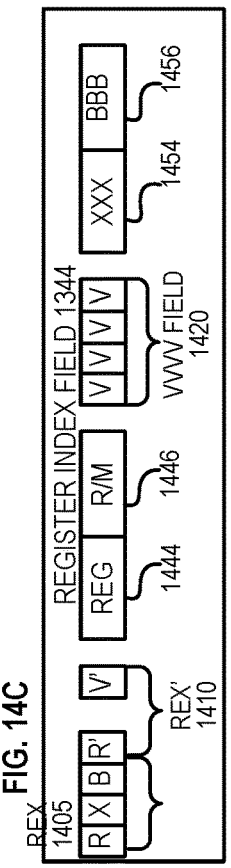
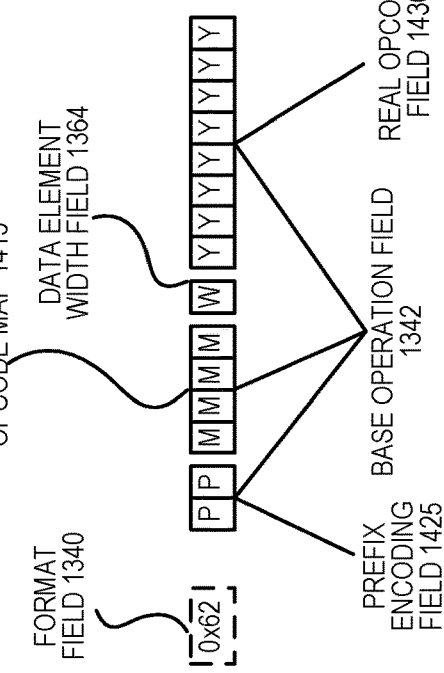
FIG. 14A
FIG. 14B
FIG. 14C

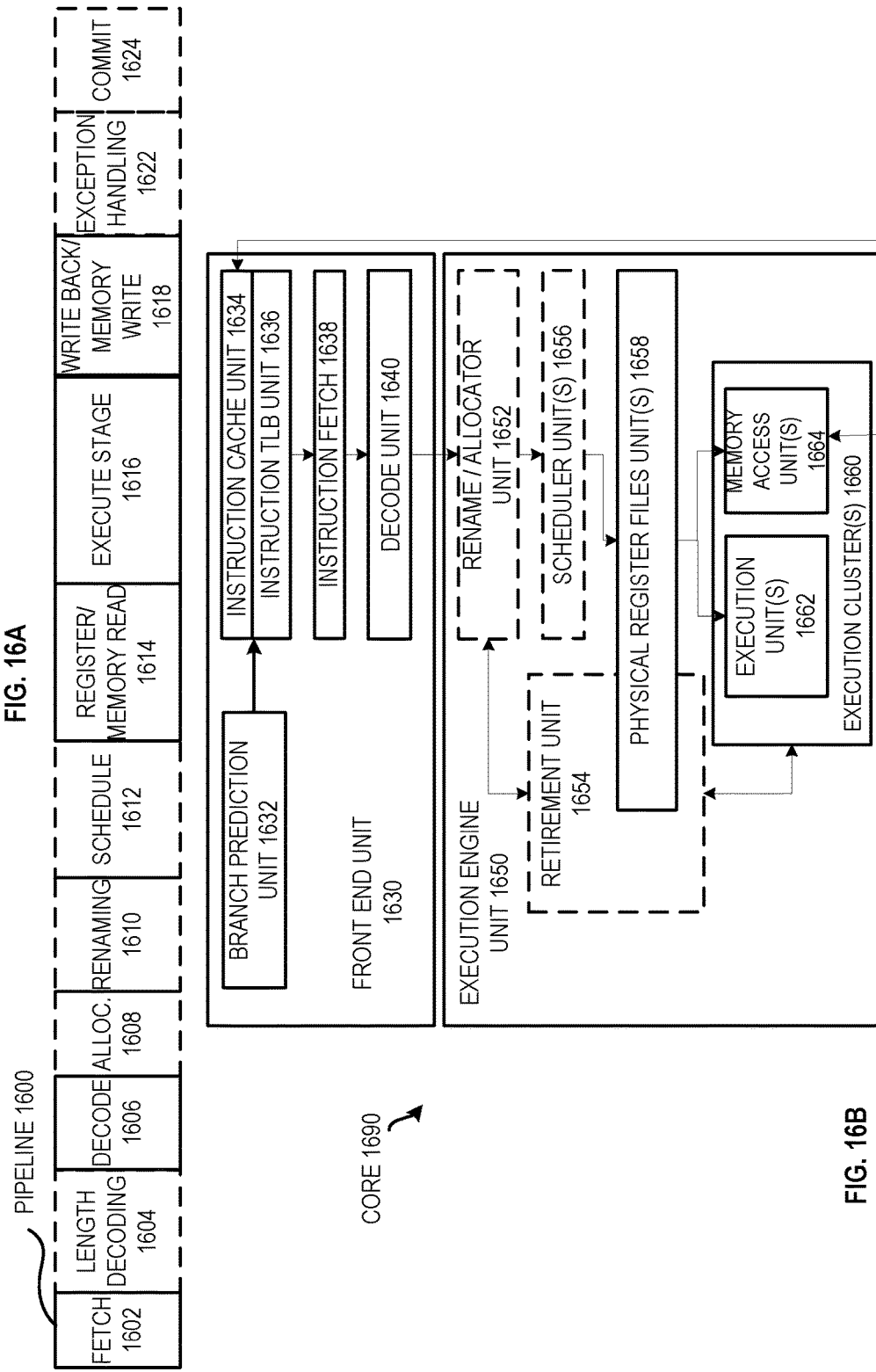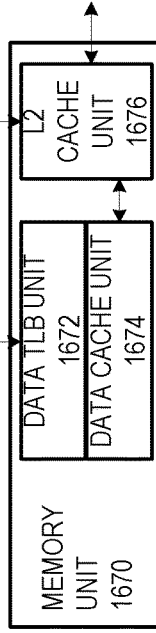

DATA ELEMENT REARRANGEMENT, PROCESSORS, METHODS, SYSTEMS, AND INSTRUCTIONS

CROSS REFERENCE TO OTHER APPLICATIONS

This patent application is a Continuation of U.S. patent application Ser. No. 14/865,696, entitled, "DATA ELEMENT REARRANGEMENT, PROCESSORS, METHODS, SYSTEMS, AND INSTRUCTIONS" filed on Sep. 25, 2015. Patent application Ser. No. 14/865,696 is hereby incorporated by reference.

BACKGROUND

Technical Field

Embodiments described herein generally relate to processors. In particular, embodiments described herein generally relate to processors to process packed data.

Background Information

Many processors have Single Instruction, Multiple Data (SIMD) architectures. In SIMD architectures, a packed data instruction, vector instruction, or SIMD instruction may operate on multiple data elements packed within a register or memory location as packed data, vector data, or SIMD data. Representatively, the bits of the register may be logically divided into a sequence of data elements. For example, a 128-bit wide packed data register may have sixteen 8-bit data elements, eight 16-bit data elements, four 32-bit data elements, or two 64-bit data elements. Each of the data elements may represent a separate individual piece of data (e.g., a pixel color, a component of a complex number, etc.), which may be operated upon separately and/or independently of the others. The processor may have parallel execution hardware, responsive to the packed data instruction, to operate on the data elements concurrently and/or in parallel.

BRIEF DESCRIPTION OF THE DRAWINGS

The invention may best be understood by referring to the following description and accompanying drawings that are used to illustrate embodiments. In the drawings:

FIG. 6 is a block flow diagram of an embodiment of a method of performing an embodiment of a scatter by indices to register instruction.

FIG. 11 is a block flow diagram of an example embodiment of a method in a processor of performing a scatter by indices to register routine.

FIGS. 12A-12C are block diagrams illustrating a generic vector friendly instruction format and instruction templates thereof, according to embodiments of the invention.

FIG. 14A-D is a block diagram illustrating an exemplary specific vector friendly instruction format and fields thereof, according to embodiments of the invention.

FIG. 16A is a block diagram illustrating an embodiment of an in-order pipeline and an embodiment of a register renaming out-of-order issue/execution pipeline.

FIG. 16B is a block diagram of an embodiment of processor core including a front end unit coupled to an execution engine unit and both coupled to a memory unit.

DETAILED DESCRIPTION OF EMBODIMENTS

Disclosed herein are instructions, processors to execute the instructions, methods performed by the processors when processing or executing the instructions, systems incorporating one or more processors to process or execute the instructions, and machine-readable mediums storing instructions. In the following description, numerous specific details are set forth (e.g., specific instruction operations, microarchitectures to implement instructions, data formats, processor configurations, sequences of operations, etc.). However, embodiments may be practiced without these specific details. In other instances, well-known circuits, structures and techniques have not been shown in detail to avoid obscuring the understanding of the description.

Figure 1:
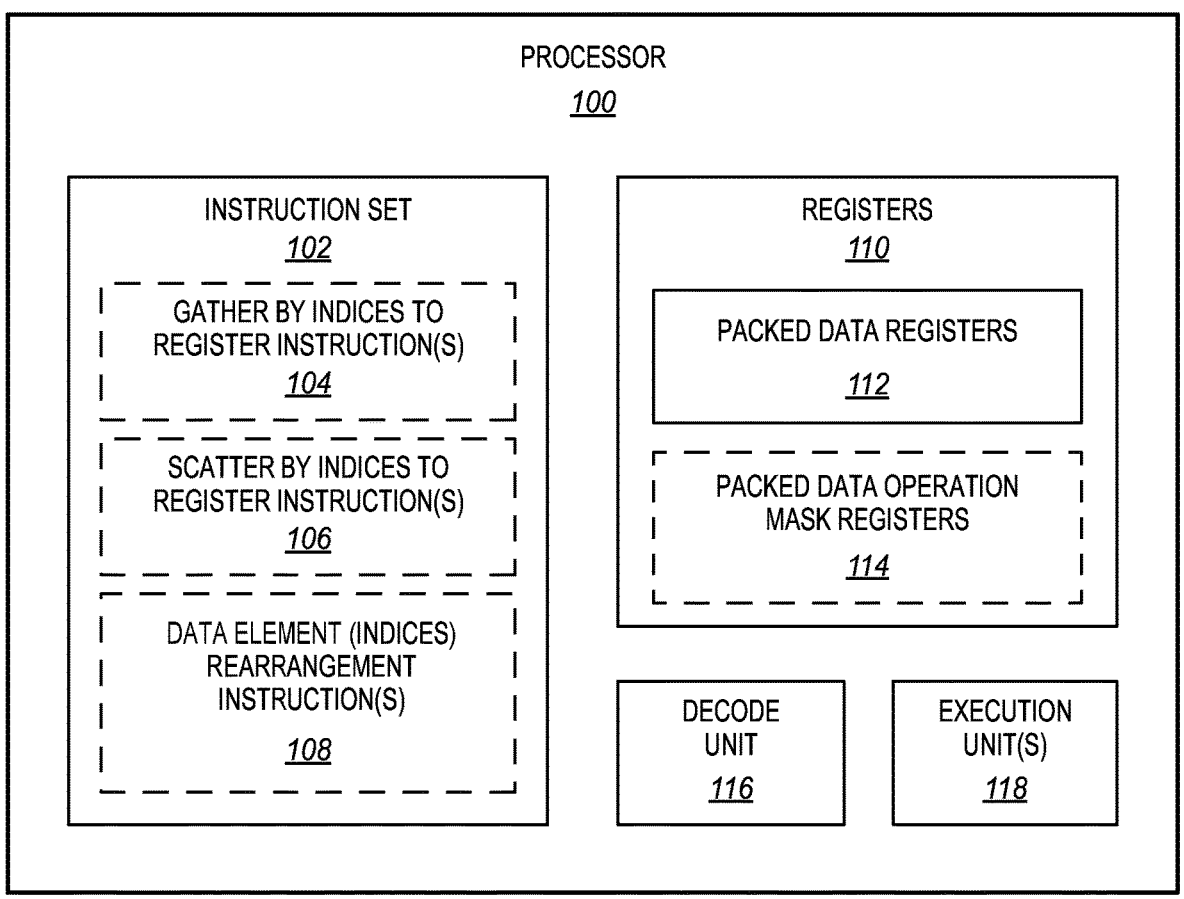
FIG. 1 is a block diagram of an embodiment of a processor.

FIG. 1 is a block diagram of an embodiment of a processor 100. In some embodiments, the processor may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers).

The processor has an instruction set architecture (ISA). The ISA represents a part of the architecture of the processor related to programming and commonly includes the native instructions, architectural registers, data types, addressing modes, memory architecture, and the like, of the processor. The ISA is distinguished from the microarchitecture, which generally represents the particular processor design techniques selected to implement the ISA. The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

The ISA includes architecturally-visible registers (e.g., an architectural register file) 110. The architectural registers may also be referred to herein simply as registers. Unless otherwise specified or apparent, the phrases architectural register, register file, and register are used herein to refer to registers that are visible to software and/or a programmer and/or the registers that are specified by macroinstructions to identify operands. These registers are contrasted to other non-architectural or non-architecturally visible registers in a given microarchitecture (e.g., temporary registers, reorder buffers, retirement registers, etc.). The registers generally represent on-die processor storage locations. As shown, the registers may include packed data registers 112 that are operative to store packed data, vector data, or SIMD data. In some embodiments, the registers may also include packed data operation mask registers 114. The optional packed data operation mask registers will be discussed further below.

The processor also has and supports an instruction set 102. The instruction set may represent the macroinstructions, assembly language instructions, or machine-level instructions that the processor is natively able to perform. As shown, the processor may have a decode unit 116 that is operative to decode the instructions of the instruction set to microinstructions, micro-ops, or other decoded instructions or control signals, and one or more execution units 118 operative to execute or perform the decoded instructions or control signals.

Referring again to FIG. 1, in some embodiments, the instruction set may optionally include at least one gather by indices to register instruction 104. The gather by indices to register instruction may also sometimes be referred to in the arts as a permute instruction and/or a shuffle instruction. The gather by indices to register instruction may be operative to use indices to gather source data elements into a result register. For example, in some embodiments, the gather by indices to register instruction may indicate a source packed data operand having data elements, may indicate a source packed indices operand having indices, and the gather by indices to register instruction when performed may select data elements of the source packed data operand with the indices, and store the selected source data elements to corresponding result data elements that correspond to indices in same relative positions within the operands.

In some embodiments, the instruction set may optionally include at least one scatter by indices to register instruction 106. The scatter by indices to register instruction may be operative to use indices to scatter source data elements to a result register. For example, in some embodiments, the scatter by indices to register instruction may indicate a source packed data operand having data elements, may indicate a source packed indices operand having indices, and the scatter by indices to register instruction when performed may select result data element of a result packed data operand with the indices, and store corresponding source data elements, which correspond to the indices in same relative positions within the operands, to the selected result data elements.

As can be readily seen, the gather by indices to register instruction, and the scatter by indices to register instruction, may use indices in different ways. In some embodiments, the instruction set may optionally include at least one data element rearrangement instruction 108 that is suitable for rearranging scatter indices to gather indices and/or gather indices to scatter indices. For example, the data element rearrangement instruction may be operative to rearrange indices of a source packed indices operand, which are arranged in a scatter pattern, to indices of a result packed indices operand, which are arranged in a gather pattern. Alternatively, the data element rearrangement instruction may be operative to rearrange indices of a source packed indices operand, which are arranged in a gather pattern, to indices of a result packed indices operand, which are arranged in a scatter pattern. It is to be appreciated that, in various embodiments, the instruction set may include as few as at least one of the instructions 104, 106, 108, or two or more of such instructions (e.g., either of the same type and/or of different types), or all of such instructions.

Advantageously, each of the instructions 104, 106, 108, either alone or in combination, may tend to help improve the performance of various different types of algorithms. Moreover, including a combination of these instructions may be advantageous. For example, if an instruction set contains a gather by indices to register instruction (e.g., a permute instruction, shuffle instruction, etc.), including at least one scatter by indices to register instruction and/or at least one scatter indices to gather indices rearrangement instruction in the instruction set may help to complement and/or provide symmetry with respect to the gather by indices to register instruction. Conversely, not having at least one of these instructions in the instruction set may tend to expose an asymmetry or deficiency that may tend to make certain algorithms costly to vectorize and/or otherwise implement.

Figure 2:
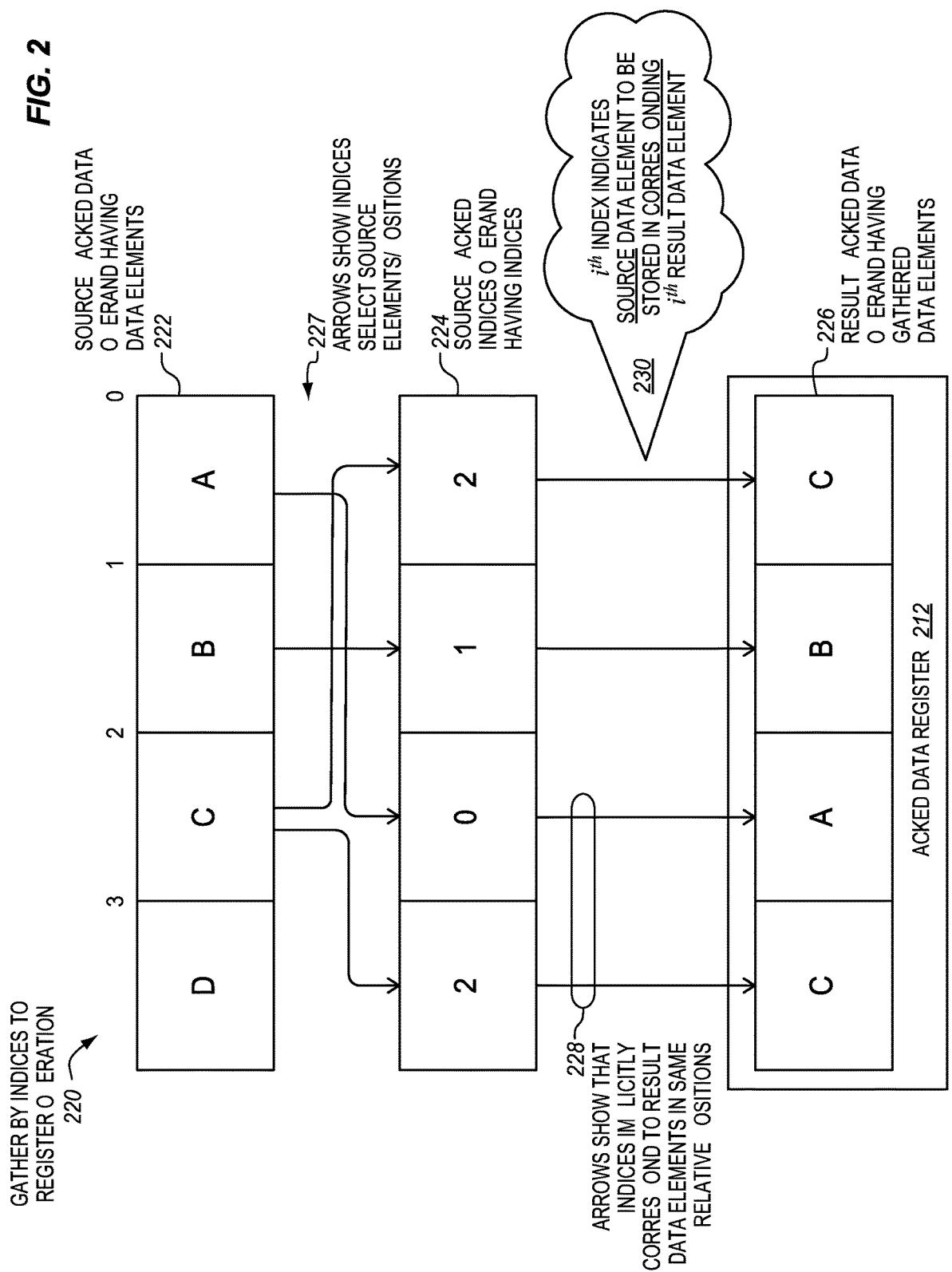
FIG. 2 is a block diagram of an example embodiment of a gather by indices to register operation.

FIG. 2 is a block diagram illustrating an example embodiment of a gather by indices to register operation 220 that may be performed in response to an embodiment of a gather by indices to register instruction. The operation may be performed by any of the various processors disclosed herein.

The instruction may specify (e.g., explicitly specify) or otherwise indicate (e.g., implicitly indicate) a source packed data operand 222 having a plurality of packed data elements. In the illustration, the data elements are labeled, when read from right to left, as the data elements A, B, C, and D. Without limitation, the data elements A, B, C, and D may represent integers, fixed-point elements, floating-point elements, or other types of data.

Shown above each of the data elements A, B, C, and D is a data element position identifier. In the illustration, the least significant data element (i.e., data element A) is on the right, and the most significant data element (i.e., data element D) is on the left. Specifically, the data element A occupies a least significant data element position zero (0), the data element B occupies a next-to-least significant data element position one (1), the data element C occupies a next-to-most significant data element position two (2), and the data element D occupies a most significant data element position three (3).

The instruction may also specify or otherwise indicate a source packed indices operand 224 having a plurality of packed indices. In the illustrated example, the indices have values, when read from right to left, of 2, 1, 0, and 2. These values are only examples. Other combinations of values may be used instead. In some embodiments, the indices may represent integer values. In some embodiments, the indices may be arranged in a gather pattern or arrangement. As will be explained further below, in some embodiments, the source packed indices operand 224 may represent a result of a scatter indices to gather indices rearrangement instruction, although the scope of the invention is not so limited.

In the illustrated embodiment, there are only four data elements and only four indices. However, in other embodiments, more data elements and/or more indices may optionally be used. Commonly, the number of data elements or indices in each source packed data operand may be equal to the size in bits of the source packed data operand divided by the size in bits of a single data element or index. In various embodiments, the sizes or widths of each of the source packed data operands may be 64-bits, 128-bits, 256-bits, 512-bits, or 1024-bits, although the scope of the invention is not so limited. In various embodiments, the sizes or widths of each data element or index may be 8-bits, 16-bits, 32-bits, or 64-bits, although the scope of the invention is not so limited. Other packed data operand sizes, data element sizes, and index sizes, are also suitable. In various embodiments, there may be at least four, at least eight, at least sixteen, at least thirty-two, at least sixty-four, or at least one hundred twenty eight data elements or indices in each of the source packed data operands.

A result packed data operand 226 having gathered source data elements may be generated and stored (e.g., by an execution unit) in a destination packed data register 212 in response to the gather by indices instruction and/or operation. The destination packed data register may be specified or otherwise indicated by the instruction.

In the case of a gather by indices instruction and/or operation, the indices of the source packed indices operand 224 are used to select or gather source data elements of the source packed data operand 222, and to store the selected or gathered source data elements to corresponding result data elements of the result packed data operand 226. A first set of arrows 227, connecting the indices with the source data elements in the source packed data operand, show that the indices are used to select source data element positions in the source packed data operand. In some embodiments, the value of each index may represent a data element position identifier to identify a given data element position in the source packed data operand. For example, as shown by the arrows 227, the index value of "2" selects, indexes, or otherwise indicates the source data element C in the data element position two (2) (i.e., for both the least significant index and the most significant index), the index value of "1" selects, indexes, or otherwise indicates the source data element B in the data element position one (1), and the index value of "0" selects, indexes, or otherwise indicates the source data element A in the data element position one (0). In other embodiments, there may be more data element positions (e.g., at least 16, 32, 64, or 128), and each index may select any one of the data element positions (e.g., any one of the 16, 32, 64, or 128).

A second set of arrows 228, connecting the indices with the result data elements in the result packed data operand, show that indices and result data elements in same relative positions within the operands correspond to one another. This correspondence may be implicit or inherent rather than explicitly specified. For example, the least significant index may implicitly correspond to the least significant result data element, the next-to-least significant index may implicitly correspond to the next-to-least significant result data element, the next-to-most significant index may implicitly correspond to the next-to-most significant result data element, and the most significant index may implicitly correspond to the most significant result data element.

The source data elements selected or gathered by the indices may be stored to the result data elements that correspond to the indices. For example, the source data element C selected by the least significant index value of "2" may be stored to the corresponding least significant result data element, the source data element B selected by the next-to-least significant index value of "1" may be stored to the corresponding next-to-least significant result data element, the source data element A selected by the next-to-most significant index value of "0" may be stored to the corresponding next-to-most significant result data element, and the source data element C selected by the most significant index value of "2" may be stored to the corresponding most significant result data element.

Accordingly, in the case of a gather by indices to register instruction and/or operation, the indices are used to select or gather source data elements, and to store the selected or gathered source data elements to implicitly corresponding result data elements in same relative positions with the indices. As generally shown at cloud 230, an $i^{th}$ positioned index may select or otherwise indicate a source data element that is to be stored in a corresponding $i^{th}$ positioned result data element.

Figure 3:
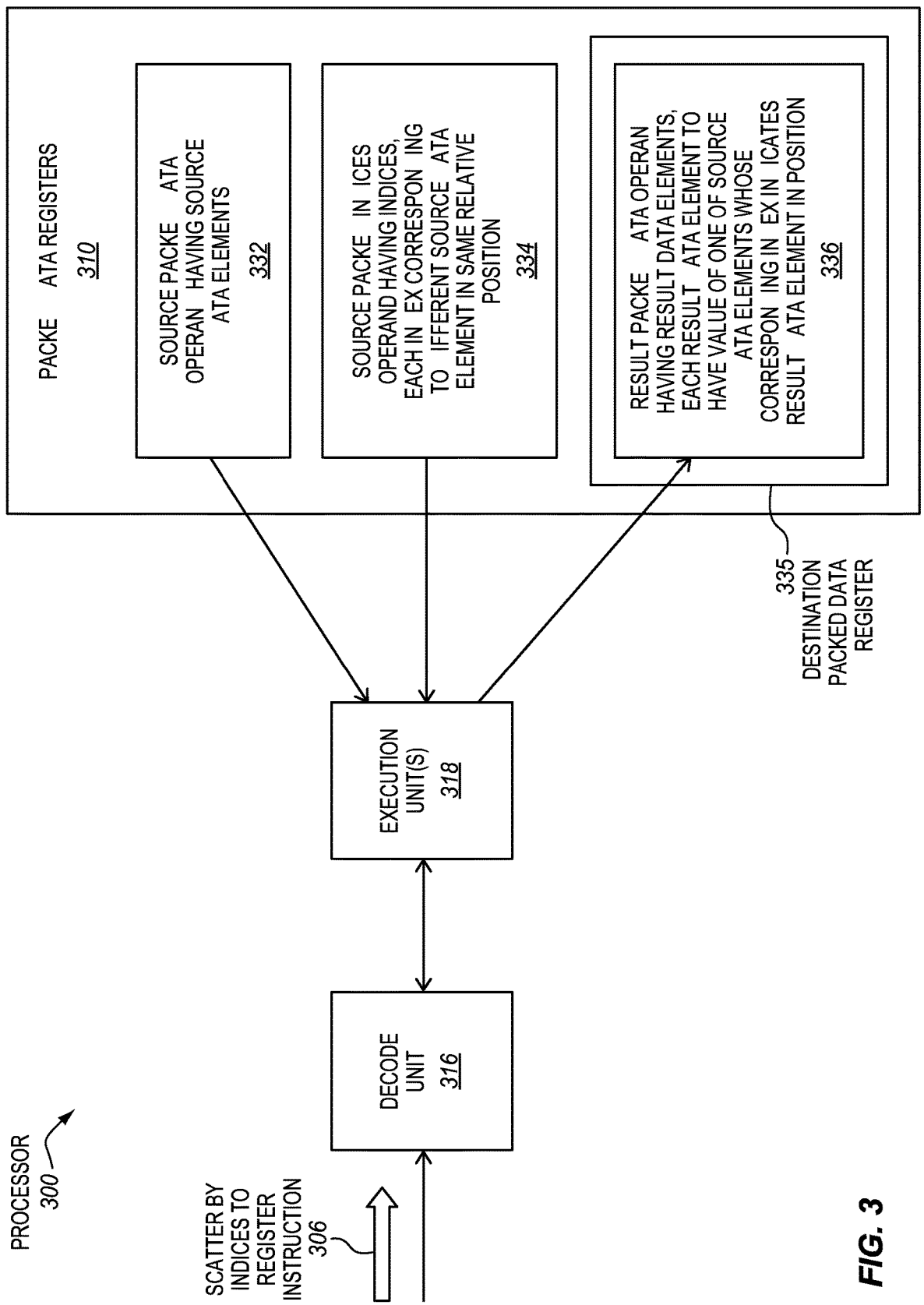
FIG. 3 is a block diagram of an embodiment of a processor that is operative to perform an embodiment of a scatter by indices to register instruction.

FIG. 3 is a block diagram of an embodiment of a processor 300 that is operative to perform an embodiment of a scatter by indices to register instruction 306. In embodiments, the processor 300 may be or may be included in the processor 100 of FIG. 1. The components, features, and specific optional details described herein for the processor 100 also optionally apply to the processor 300. Alternatively, the processor 300 may be, or may be included in, a similar or different processor that the processor 100. Moreover, the processor 100 may either be or include a similar or different processor than the processor 300.

During operation, the processor 300 may receive the scatter by indices to register instruction 306. For example, the instruction may be received from memory over a bus or other interconnect. The instruction may represent a macroinstruction, assembly language instruction, machine code instruction, or other instruction or control signal of an instruction set of the processor. In some embodiments, the scatter by indices to register instruction may explicitly specify (e.g., through one or more fields or a set of bits), or otherwise indicate (e.g., implicitly indicate), a source packed data operand 332 having a plurality of packed data elements, may specify or otherwise indicate a source packed indices operand 334 having a plurality of packed indices, and may specify or otherwise indicate a destination packed data register 335 where a result packed data operand 336 is to be stored. As one example, the instruction may have source and/or destination operand specification fields to specify packed data registers or other storage locations for the source and/or destination operands. Alternatively, one or more of these operands may optionally be implicit to the instruction (e.g., implicit to an opcode of the instruction). In one aspect, the data of the source operands may have been received from an input/output device (e.g., a network interface, video input device, wireless interface, audio input device, etc.).

Referring again to FIG. 3, the processor includes a decode unit 316. The decode unit is also sometimes referred to as a decoder. The decode unit may receive and decode the scatter by indices to register instruction 306. The decode unit may output one or more relatively lower-level instructions or control signals (e.g., one or more microinstructions, micro-operations, micro-code entry points, decoded instructions or control signals, etc.), which reflect, represent, and/or are derived from the relatively higher-level scatter by indices to register instruction. In some embodiments, the decode unit may include one or more input structures (e.g., port(s), interconnect(s), an interface) to receive the scatter by indices to register instruction, an instruction recognition and decode logic coupled therewith to recognize and decode the scatter by indices to register instruction, and one or more output structures (e.g., port(s), interconnect(s), an interface) coupled therewith to output the lower-level instruction(s) or control signal(s). The decode unit may be implemented using various different mechanisms including, but not limited to, microcode read only memories (ROMs), look-up tables, hardware implementations, programmable logic arrays (PLAs), and other mechanisms suitable to implement decode units.

In some embodiments, instead of the scatter by indices to register instruction being provided directly to the decode unit, an instruction emulator, translator, morpher, interpreter, or other instruction conversion module may optionally be used. Various types of instruction conversion modules may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive the scatter by indices to register instruction, which may be of a first instruction set, and may emulate, translate, morph, interpret, or otherwise convert the scatter by indices to register instruction to one or more corresponding intermediate instructions or control signals, which may be of a second different instruction set. The one or more intermediate instructions or control signals of the second instruction set may be provided to a decode unit (e.g., decode unit 316), which may decode them to one or more lower-level instructions or control signals executable by native hardware of the processor (e.g., one or more execution units).

Referring again to FIG. 3, the processor 300 also includes a set of packed data registers 310. Each of the packed data registers may represent an on-die storage location that is operative to store packed data, vector data, or Single instruction, multiple data (SIMD) data. The packed data registers may represent architecturally-visible or architectural registers that are visible to software and/or a programmer and/or are the registers indicated by instructions of the instruction set of the processor to identify operands. These architectural registers are contrasted to other non-architectural registers in a given microarchitecture (e.g., temporary registers, reorder buffers, retirement registers, etc.). The packed data registers may be implemented in different ways in different microarchitectures and are not limited to any particular type of design. Examples of suitable types of registers include, but are not limited to, dedicated physical registers, dynamically allocated physical registers using register renaming, and combinations thereof.

As shown, in some embodiments, the source packed data operand 332 may optionally be stored in a first packed data register, the source packed indices operand 334 may optionally be stored in a second packed data register, and the destination packed data register 335 may optionally be a third still different packed data register. Alternatively, memory locations, or other storage locations, may optionally be used for one or more of the source operands. Moreover, in some embodiments, a packed data register used for a source operand may optionally be reused as a destination for the result packed data operand. In one aspect, a source/destination register may be explicitly specified once and implicitly or impliedly understood to be used for both a source packed operand and as the destination to store the result packed data operand.

Referring again to FIG. 3, the execution unit 318 is coupled with the decode unit 316 and is coupled with the packed data registers 310. The execution unit may receive the one or more decoded or otherwise converted instructions or control signals that represent and/or are derived from the scatter by indices to register instruction. The execution unit may also receive the source packed data operand 332 and the source packed indices operand 334. The execution unit is operative in response to and/or as a result of the scatter by indices to register instruction (e.g., in response to one or more instructions or control signals decoded from the instruction) to store the result packed data operand 336 in the destination packed data register 335 indicated by the instruction. The result packed data operand may include a plurality of result data elements (e.g., at least four, eight, sixteen, thirty two, or optionally more).

In some embodiments, each result data element may have a value of one of the source data elements of the source packed data operand whose corresponding index (e.g., that is in a same relative position in the source packed indices operand) indicates the data element position of the result data element in the result packed data operand. In some embodiments, not all of the source data element values may be stored to the result packed data operand (e.g., in the case of duplicate indices). In some embodiments, if none of the indices indicate a given result data element position, one of a zero value and a merged value (e.g., a value initially in the packed data register prior to performance of the instruction) may optionally be stored in the given result data element position. In some embodiments, the result may be any of those shown and described for FIGS. 4-5 including any of the variations mentioned therefor, although the scope of the invention is not so limited.

The execution unit and/or the processor may include specific or particular logic (e.g., transistors, integrated circuitry, or other hardware potentially combined with firmware (e.g., instructions stored in non-volatile memory) and/or software) that is operative to perform the scatter by indices to register instruction and/or store the result in response to and/or as a result of the scatter by indices to register instruction (e.g., in response to one or more instructions or control signals decoded from the scatter by indices to register instruction). In some embodiments, the execution unit may include one or more input structures (e.g., port(s), interconnect(s), an interface) to receive source operands, circuitry or logic coupled therewith to receive and process the source operands and generate the result operand, and one or more output structures (e.g., port(s), interconnect(s), an interface) coupled therewith to output the result operand. In some embodiments, the execution unit may include the circuitry or logic shown and described for FIG. 5, which is an illustrative example of suitable micro-architectural arrangements, although the scope of the invention is not so limited.

Advantageously, scatter by indices to register operations may optionally be performed. By way of example, such operations often tend to be useful in sorting, set union, sparse linear algebra, machine learning, and like algorithms, although the instructions disclosed herein are general-purpose instructions that may be used for other general purposes. In one aspect, such instructions may help to compliment an existing gather by indices to register instruction and/or microarchitecture and thereby help to provide symmetry which may tend to make some algorithms easier to implement and/or vectorize. Another possible way to perform a scatter by indices to register operation is to use a sequence of instructions. However, instead using an architectural instruction may provide hardware acceleration to achieve better performance than would normally be possible with a software implementation.

To avoid obscuring the description, a relatively simple processor 300 has been shown and described. However, the processor may optionally include other processor components. For example, various different embodiments may include various different combinations and configurations of the components shown and described for any of FIGS. 12-14. All of the components of the processor that interact with one another may be coupled with one another in order to allow them to operate as intended.

Figure 4:
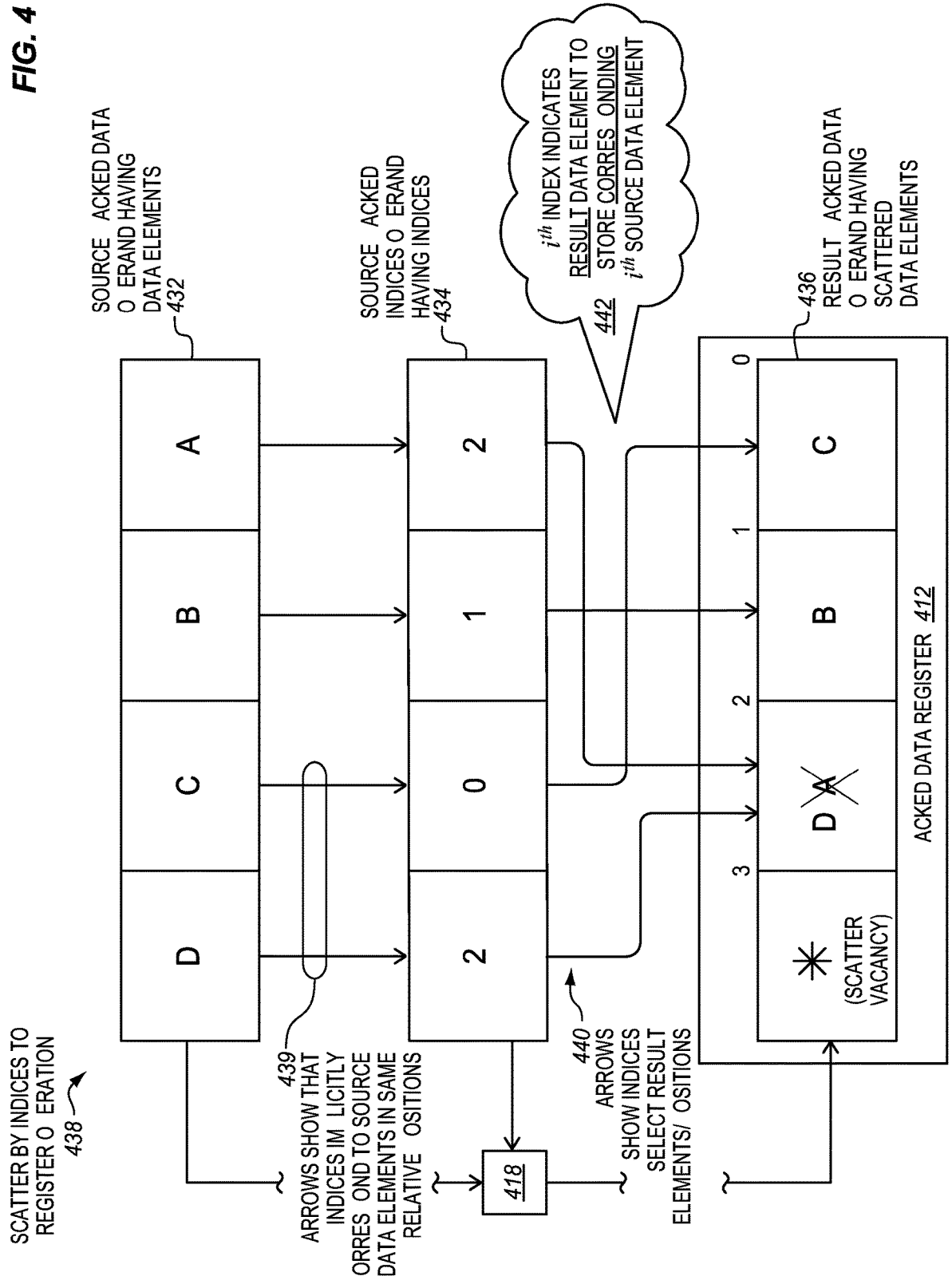
FIG. 4 is a block diagram of an example embodiment of a scatter by indices to register operation.

FIG. 4 is a block diagram illustrating an example embodiment of a scatter by indices to register operation 438 that may be performed in response to an embodiment of a scatter by indices to register instruction (e.g., instruction 106 or instruction 306). The operation may be performed by any of the various processors disclosed herein.

The instruction may specify (e.g., explicitly specify) or otherwise indicate (e.g., implicitly indicate) a source packed data operand 432 having a plurality of packed data elements. In the illustration, the data elements are labeled, when read from right to left, as the data elements A, B, C, and D. Without limitation, the data elements A, B, C, and D may represent integers, fixed-point elements, floating-point elements, or other types of data. In the illustration, the least significant or lowest order position is shown on the right and the most significant or highest order position is shown on the left.

The instruction may also specify or otherwise indicate a source packed indices operand 432 having a plurality of packed indices. In the illustrated example, the indices have values, when read from right to left, of 2, 1, 0, and 2. These values are only examples. Other combinations of values may be used instead. In some embodiments, the indices may represent integer values. In some embodiments, the indices may be arranged in a scatter pattern or arrangement (e.g., according to an algorithm or software using the indices).

In the illustrated embodiment, there are only four data elements and only four indices. However, in other embodiments, more data elements and/or more indices may optionally be used. Commonly, the number of data elements or indices in each source packed data operand may be equal to the size in bits of the source packed data operand divided by the size in bits of a single data element or index. In various embodiments, the sizes or widths of each of the source packed data operands may be 64-bits, 128-bits, 256-bits, 512-bits, or 1024-bits, although the scope of the invention is not so limited. In various embodiments, the sizes or widths of each data element or index may be 8-bits, 16-bits, 32-bits, or 64-bits, although the scope of the invention is not so limited. Other packed data operand sizes, data element sizes, and index sizes, are also suitable. In various embodiments, there may be at least four, at least eight, at least sixteen, at least thirty-two, at least sixty-four, or at least one hundred twenty eight data elements or indices in each of the source packed data operands.

A result packed data operand 436 having scattered source data elements may be generated and stored (e.g., by an execution unit 418) in a destination packed data register 212 in response to the scatter by indices instruction and/or operation. The source packed data and indices operands may be input to the execution unit and the execution unit responsive to the instruction/operation may output the result packed data operand to the destination packed data register, which may be specified or otherwise indicated by the instruction.

In the case of a scatter by indices instruction and/or operation, the indices of the source packed indices operand 434 are used to select result data elements in the result packed data operand where corresponding source data elements of the source packed data operand are to be scattered or stored. A first set of arrows 439, connecting the indices with the source data elements in the source packed data operand, show that indices and source data elements in same relative positions within the operands correspond to one another. For example, the least significant (in this case rightmost) index may implicitly correspond to the least significant (in this case rightmost) source data element A, the next-to-least significant index may implicitly correspond to the next-to-least significant source data element B, the next-to-most significant index may implicitly correspond to the next-to-most significant source data element C, and the most significant (in this case leftmost) index may implicitly correspond to the most significant (in this case leftmost) source data element D. This correspondence may be implicit or inherent rather than explicitly specified. In some embodiments, the implicit or inherent correspondence may be fixed for the instruction (e.g., fixed for an opcode of the instruction), instead of being flexible or explicitly specified by the instruction. Representatively, such implicit or inherent correspondence may help to avoid needing to generate and use additional explicit control.

A second set of arrows 440, connecting the indices with the result data elements in the result packed data operand, show that the indices are used to select result data elements (e.g., result data element positions) in the result packed data operand. In some embodiments, the value of each index may represent a data element position identifier to identify a given result data element position in the result packed data operand. In the illustration, the least significant result data element is on the right, and the most significant result data element is on the left. Shown above each of the result data elements is a data element position identifier (e.g., the data element position identifiers 0, 1, 2, and 3 when read from right to left).

In this example, as shown by the arrows 440, the least significant (in this case rightmost) index value of "2" selects, indexes, or otherwise indicates the result data element at data element position two (2), the next-to-least significant (in this case next-to-rightmost) index value of "1" indicates the result data element at data element position one (1). Continuing, the next-to-most significant (in this case next-to-leftmost) index value of "0" indicates the result data element at data element position zero (0), and the most significant (in this case leftmost) index value of "2" indicates the result data element at data element position two (2).

The source data elements corresponding to the indices (e.g., in same relative positions as the indices within the operands) may be scattered or stored to the result data elements selected or indicated by the indices. For example, the source data element A corresponding to the least significant (in this case rightmost) index value of "2" may (except in the case of duplicate indices as discussed further below) be stored to the selected result data element at data element position two (2), the source data element B corresponding to the next-to-least significant (in this case next-to-rightmost) index value of "1" may be stored to the selected result data element at data element position one (1), the source data element C corresponding to the next-to-most significant (in this case next-to-leftmost) index value of "0" may be stored to the selected result data element at data element position zero (0), and the source data element D corresponding to the most significant (in this case leftmost) index value of "2" may be stored to the selected result data element at data element position two (2). As shown, the result packed data operand may store, when read from right to left, the data elements C, B, D, and *.

Accordingly, in the case of a scatter by indices to register instruction and/or operation, the indices are used to select or identify result data elements (e.g., result data element positions), and implicitly corresponding source data elements, in the same relative positions with the operands, are to be stored to the result data elements indicated by the indices. As generally shown at cloud 442, in the case of a scatter by indices to register instruction and/or operation, an $i^{th}$ positioned index may select or otherwise indicate a result data element that is to store a corresponding $i^{th}$ positioned source data element. The indices of the register scatter instruction may specify where in the destination packed data register to push or scatter corresponding source data elements. Accordingly, the scatter by indices to register instruction and/or operation is different than the gather by indices to register instruction and/or operation in that the indices implicitly correspond to the source packed data operand instead of the result packed data operand, and in that the indices select positions in the result packed data operand instead of the source packed data operand.

In some embodiments, there may be one or more sets of duplicate indices. The duplicate indices of each set may have the same value or at least indicate the same result data element (e.g., if certain more significant bits of the indices not used for result data element selection are ignored). For example, as shown in the illustrated example embodiment, both the least significant (in this case rightmost) index, as well as the most significant (in this case leftmost) index, have the same value of "2". Due to the indices corresponding flexibly to the result data elements in scatter by indices to register instructions and/or operations, if there are duplicate indices having the same value, then each of the duplicated indices may indicate the same result data element position for their corresponding source data element. For example, in the illustrated embodiment, both indexes having a value of "2" may select the same result data element at data element position two (2) to store their corresponding source data elements. However, generally only one of the source data elements may be stored to the indicated result data element. In some embodiments, a consistent policy may be used to decide which duplicate index to use to store to an indicated result data element. For example, in some embodiments, the most significant duplicate index of a given value may optionally be selected to write its corresponding source data element to the indicated result data element that is indicated by the given value. Advantageously, such a convention may be similar to that employed by other instructions, such as, for example, scatter to memory instructions, vector conflict instructions, and the like, and may therefore potentially be more compatible with algorithms employing such instructions. Alternatively, if desired, the least significant duplicate index of a given value may optionally be selected to write its corresponding source data element to the indicated result data element that is indicated by the given value.

In addition, the presence of duplicate indices may tend to create scatter vacancies or "holes," which may represent result data elements to which no source data elements are stored. For example, assuming the number of input and output elements matches, each duplicate index may lead to a corresponding scatter vacancy. In the illustrated example, the most significant (in this case leftmost) result data element at data element position three (3) has an asterisk (*) to indicate such a scatter vacancy or hole. As shown, none of the indices have a value of three (3), and accordingly none of the arrows 440 point to the result data element at data element position three (3). In other words, none of the indices may attempt to scatter source data elements to such scatter vacancies or holes. In some embodiments, the scatter by indices to register instruction may indicate a type of value that is to be stored in such scatter vacancies or holes. For example, in some embodiments, such scatter vacancies may optionally be zeroed (e.g., all of the bits of the result data elements cleared to binary zero) responsive to performing a scatter by indices to register instruction. Alternatively, in other embodiments, existing values in the same data element positions in the same packed data register may optionally be preserved or retained in the place of scatter vacancies responsive to performing a scatter by indices to register instruction. For example, the values of the data elements initially in the packed data register before the instruction is performed may be merged into the scatter vacancy positions in the result packed data operand.

Different ways of implementing scatter by indices to register instructions are contemplated. In some embodiments, such instructions may be implemented by logic that is operative to: (a) identify the most significant index in each of any sets of duplicate indices; (b) store the corresponding source data elements for the identified most significant indices to the result data elements identified by the most significant duplicate indices; and (c) store the corresponding source data elements for any non-duplicate indices to the result data elements identified by those non-duplicate indices; and (d) store zeroes or merged values to any scatter vacancies. This may be done in different ways in different embodiments. To further illustrate certain concepts, a detailed example embodiment of a suitable approach will be described in conjunction with FIG. 5, although the scope of the invention is not so limited.

Figure 5:
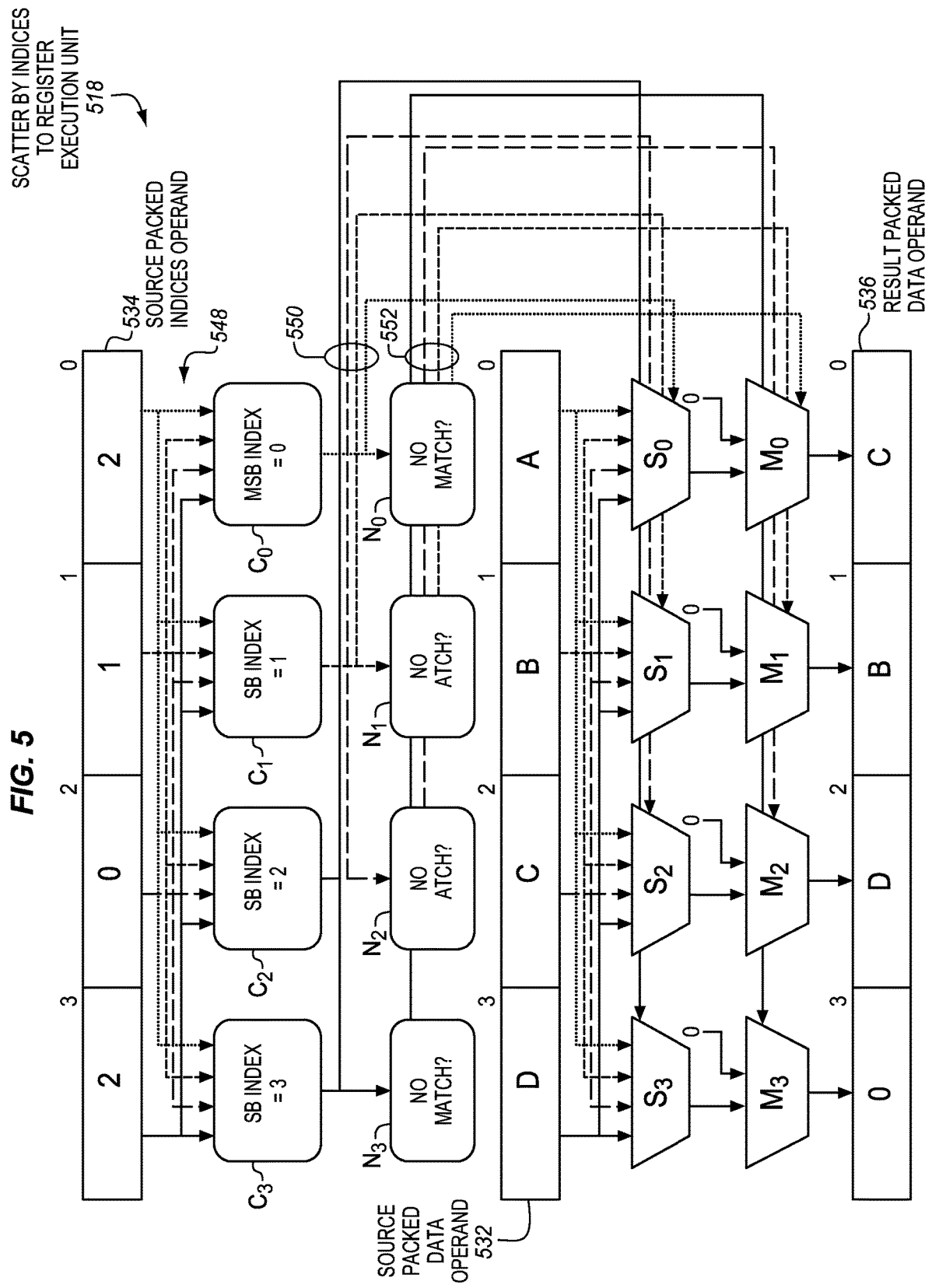
FIG. 5 is a block diagram of a detailed example embodiment of a scatter by indices to register execution unit.

FIG. 5 is a block diagram of a detailed example embodiment of a scatter by indices to register execution unit 518 that is suitable to implement an embodiment of a scatter by indices to register instruction. The execution unit may include input ports, an input interface, or other structure(s) to receive a source packed indices operand 534 and a source packed data operand 532. In this example, for ease of illustration, each of these source packed operands has only four respective indices or data elements, although other numbers of data elements and indices described elsewhere herein (e.g., eight, sixteen, thirty two, sixty four, one hundred twenty eight, etc.) may optionally be used in other embodiments. In the illustrated embodiment, the four indices have the values, from right to left, of 2, 1, 0, and 2, although these are only examples.

The execution unit includes a full crossbar or other suitable interconnection circuitry 548 to provide each of the four indices to each of four comparators C0, C1, C2, C3. For example, each of the four indices may be provided to a first comparator C0, each of the four indices may be provided to a second comparator C1, and so on. Each of the comparators may be operative to compare each of the indices with a different corresponding data element position identifier that corresponds to that comparator. The number of data element position identifiers may be the same as the number of result data elements (e.g., in this case four). As labeled in the illustration, the four data element position identifiers may have values of 0, 1, 2, and 3. As shown, the first comparator (C0) may correspond to, and may compare each of the four input indices with, a corresponding data element position identifier value of zero (0), the second comparator (C1) may correspond to, and may compare each of the four input indices with, a corresponding data element position identifier value of one (1), the third comparator (C2) may correspond to, and may compare each of the four input indices with, a corresponding data element position identifier value of two (2), and the fourth comparator (C3) may correspond to, and may compare each of the four input indices with, a corresponding data element position identifier value of three (3).

In the illustrated embodiment, the comparators may be operative to compare indices and in the case of duplicate indices to arbitrate, or otherwise identify, for each result data element position the most significant index whose value matches that result data elements position. Alternatively, in other embodiments, the least significant matching index may be optionally be used in the case of duplicates, as previously described. In some embodiments, these comparisons may optionally be based on only a subset of the least significant bits of the indices instead of all of the bits of the indices. Generally, this may help to improve the performance of performing these comparisons and/or help to reduce the complexity of hardware to perform the comparisons. For example, only the least significant ($\log_2$ VLEN bits) of each index may optionally be used, where VLEN represents the number of result data elements in the result packed data operand (e.g., 4 bits 512-bit packed data operands and dword indices). Alternatively, all of the bits of the indices may optionally be compared, if desired. Each of the comparators, if a match is detected, may be operative to output a different corresponding one of a set of first signals 550 to indicate the position of the most significant index that matches the corresponding data element position identifier.

By way of example, the first comparator C0 may compare each of the four indices 2, 1, 0, and 2 with a data element position identifier value of zero (0), and determine that only the next-to-most significant index (i.e., in index position 2) has a matching index value of zero (0). The first comparator C0 may responsively output a corresponding one of the first signals 550 to indicate the value of 2, which is the position where the matching index value of zero (0) was located in the source packed indices operand. The second comparator C1 may also compare each of the four indices 2, 1, 0, and 2 with a data element position identifier value of one (1), and determine that only the next-to-least significant index (i.e., in index position 1) has a matching index value of one (1). The second comparator C1 may responsively output a corresponding one of the first signals 550 to indicate a value of 1. The third comparator C2 may also compare each of the four indices 2, 1, 0, and 2 with a data element position identifier value of two (2), determine that both the least significant index (i.e., in index position 0) and the most significant index (i.e., in index position 3) have matching index values of two (2), and select the most significant of the two duplicate indices (i.e., in index position 3). The third comparator C2 may responsively output a corresponding one of the first signals 550 to indicate a value of 3. The fourth comparator C3 may compare each of the four indices 2, 1, 0, and 2 with a data element position identifier value of one (3), and determine that none of the indices match this data element position identifier. The fourth comparator C3 may responsively output a corresponding one of the first signals 550 to indicate no match and/or may omit outputting the first signal.

The execution unit also includes four no-match detection units N0, N1, N2, N3, which each correspond to a different one of the four comparators C0-C3. Each no-match detection unit may be coupled to receive the corresponding first signal output from the corresponding comparator, and may be operative to determine whether or not it indicates that at least one matching index was detected. Each no-match detection unit may be operative to output a corresponding one of a set of second signals 552 to indicate whether or not at least one matching index was detected by the corresponding comparator.

By way of example, since the first comparator C0 detected a matching index value, the no-match detection unit N0 may output a corresponding one of the second signals 552 to indicate that a match was detected. Similarly, since the second comparator C1 detected a matching index value, the no-match detection unit N1 may output a corresponding one of the second signals 552 to indicate that a match was detected. Likewise, since the third comparator C2 detected a matching index value, the no-match detection unit N2 may output a corresponding one of the second signals 552 to indicate that a match was detected. In contrast, since the fourth comparator C3 did not detect a matching index value (e.g., recall that none of the indices has a value of three (3)), the no-match detection unit N3 may output a corresponding one of the second signals 552 to indicate that no match was detected.

The execution unit also includes a first set of four multiplexors or other selectors S0, S1, S2, and S3 that each correspond to a different one of four result data elements. Four source data elements A, B, C, and D, of the source packed data operand 532, may be input to a full crossbar or other suitable interconnection circuitry. The interconnection circuitry is coupled to provide each of the four source data elements A-D to each of the four selectors S0-S3. For example, each of A-D may be provided to the first selector S0, each of A-D may be provided to the second selector S1, and so on.

As shown, each of the four selectors S0-S3 is also coupled to receive a different corresponding one of the first signals 550 from a different corresponding one of the four comparators C0-C3. For example, S0 may receive a first signal from C0, S1 may receive a first signal from C1, and so on. These first signals may represent selection control signals or inputs to the selectors S0-S3 that are operative to control the selectors to select and output an indicated one of the four source data elements that is in the data element position that is indicated by the first signal. By way of example, since the first signal 550 from the first comparator C0 indicated a value of 2, the first selector S0 may be controlled to select and output data element C in data element position two (2) in the source packed data operand 532. Likewise, since the first signal 550 from the second comparator C1 indicated a value of 1, the second selector S1 may be controlled to select and output data element B in data element position one (1) in the source packed data operand 532. Similarly, since the first signal 550 from the third comparator C2 indicated a value of 3, the third selector S2 may be controlled to select and output data element D in data element position three (3) in the source packed data operand.

The execution unit also includes a second set of four multiplexors or other selectors M0, M1, M2, and M3 that each correspond to a different one of the first set of selectors S0-S3 and/or a different one of the result data elements. Each of the second set of selectors M0-M3 has a first input that is coupled to receive the selected and output source data element from the corresponding one of the selectors S0-S3. For example, the first input to the selector M0 may receive the data element C, the first input to the selector M1 may receive the data element B, the first input to the selector M2 may receive the data element D, etc. Each of the second set of selectors M0-M3 also has a second input that is coupled to receive a zero value. Alternatively, in another embodiment, in the case of merging rather than zeroing, each of the second inputs may optionally be coupled to receive the initial value in a corresponding data element position of the packed data register that is to be used to store the result packed data operand 536.

As shown, each of the second set of selectors M0-M3 is also coupled to receive a different corresponding one of the second signals 552 from a different corresponding one of the four no match detectors N0-N3. For example, M0 may receive the second signal 552 from N0, M1 may receive the second signal 552 from N1, M3 may receive the second signal 552 from N3, etc. These second signals 552 may represent selection control signals that are operative to control each of the second set of selectors M0-M3 to select and output to a corresponding result data element either the corresponding input data element or the input zero value (e.g., or the input merged value in the case of merging). For example, when the second signal indicates that a matching index was detected the input data element may be selected and stored to the result packed data element. In contrast, when the second signal indicates that a matching index was not detected the zero value (or the merged value) be selected and stored to the result packed data element. As shown, since matches were detected by each of the first through third comparators C0-C2, the three least significant result data elements in data element positions 0, 1, and 2 store the values of the input data elements C, B, and D, respectively. However, since no match was detected by the forth comparator C3, the zero value is stored to the most significant result data element in data element position 3.

In one aspect, first set of selectors S0-S3, and the interconnects that provide the source packed data elements to them, may have logic similar to that which may be used to implement a shuffle, permute, or other gather by indices to register instruction and/or operation. However, the control signals to the first set of selectors may be determined through comparison (e.g., the comparators C0-C3 and first signals), instead of more directly from gather indices in a source packed gather indices operand. Moreover, the second set of selectors M0-M3 may have logic similar to that additionally used to add masking to implement a masked shuffle, masked permute, or other masked gather by indices to register instruction and/or operation.

It is to be appreciated that this is just one illustrative example of a suitable execution unit. Variations on the illustrated execution unit are contemplated. For example, the comparators C0-C3 may be modified to incorporate logic similar to that described for the no-match detection units so that they may generate and output both the described first signals and the second signals. Moreover, the first and second sets of sectors may optionally be combined into a single set of selectors that additionally receive the zero values (or merged values) and select among the input source data elements and the zero values (or merged values). Still other variations will be apparent to those skilled in the art and having the benefit of the present disclosure. The scope of the invention is not limited to any known way to implement the logic to achieve a scatter by indices to register instruction and/or operation.

Other approaches are also contemplated. For example, one alternate approach may be implemented with sort logic (e.g., a sort network) that may treat the source indices as "keys," the index positions as "values," and may be operative to sort the key-value pairs in order to sort the indices. By way of example, consider source indices having the values:

{0, 2, 3, 7, 1, 4, 5, 6}

Index position identifiers may be associated with these source indices to provide index:position pairs which may represent key:value pairs, as follows:

{0:0, 2:1, 3:2, 7:3, 1:4, 4:5, 5:6, 6:7}

Such key:value pairs may be sorted based on the keys (i.e., the indices) to produce:

{0:0, 1:4, 2:1, 3:2, 4:5, 5:6, 6:7, 7:3}

Then, the values (i.e., position identifiers) may be extracted and maintained in the same order by removing the keys (i.e., the indices) to obtain the rearranged indices as follows:

{0, 4, 1, 2, 5, 6, 7, 3}

This sort based implementation may potentially offer an advantage of less total comparisons than in the approach shown in FIG. 5, although not necessarily offering a shorter latency due in part to the way the comparisons are related. In addition, such a sort based approach may impose more constraints on vacancies and duplicates in the source indices. For example, if the source indices have j duplicates of i, there may need to be vacancies at i+1, . . . , i+j−1. For example, {0, 2, 3, 7, 1, 3, 5, 6} may represent a valid input, since there is a vacancy at "4" because of two duplicate indices of "3". This is a valid input because the sort will produce {0, 4, 1, 2, 5, 6, 7, 3} and executing permute instruction with these output indices correctly implement an inverse permutation with the input indices, assuming duplicates are masked out. However, {0, 2, 3, 7, 1, 3, 4, 6} may represent an invalid input, since a permute with the corresponding sort output {0, 4, 1, 2, 5, 6, 7, 3}, the sixth input will go to the fifth data element position instead of going to the fourth data element position (assuming zero-based indexing).

FIG. 6 is a block flow diagram of an embodiment of a method 660 of performing an embodiment of a scatter by indices to register instruction. In various embodiments, the method may be performed by and/or within a processor, instruction processing apparatus, or other digital logic device. In some embodiments, the method of FIG. 6 may be performed by and/or within the processor of FIG. 1 and/or FIG. 3. The components, features, and specific optional details described herein for the processor of FIG. 1 and/or FIG. 3, also optionally apply to the method 660. Alternatively, the method 660 may be performed by and/or within a similar or different processor or apparatus. Moreover, the processor of FIG. 1 and/or FIG. 3 may perform methods the same as, similar to, or different than the method 660.

The method includes receiving the scatter by indices to register instruction, at block 661. In various aspects, the instruction may be received at a processor or a portion thereof (e.g., an instruction fetch unit, a decode unit, a bus interface unit, etc.). In various aspects, the instruction may be received from an off-processor and/or off-die source (e.g., from memory, interconnect, etc.), or from an on-processor and/or on-die source (e.g., from an instruction cache, instruction queue, etc.). The instruction may specify or otherwise indicate a source packed data operand having a plurality of source data elements, and may specify or otherwise indicate a source packed indices operand having a plurality of indices. In some embodiments, each of the indices may correspond to a different one of the source data elements in a same relative position within the operands. The instruction may also specify or otherwise indicate a destination packed data register.

A result packed data operand may be stored in the destination packed data register in response to and/or as a result of the scatter by indices to register instruction, at block 662. The result packed data operand may include a plurality of result data elements. In some embodiments, each result data element may have a value of one of the source data elements whose corresponding index (e.g., in a same relative position in the source packed indices operand) indicates a data element position of the result data element in the result packed data operand.

In some embodiments, not all of the source data element values may be stored to the result packed data operand (e.g., in the case of duplicates). In some embodiments, in the case of duplicates, each result data element may have a value of a most significant (or alternatively the least significant) source data element whose corresponding index indicates the result data element position. In some embodiments, if none of the indices indicate given result data element position, either a zero value or a merged value (e.g., a value initially in the packed data register prior to performance of the instruction) may optionally be stored in the given result data element position. In some embodiments, the result may be any of those shown and described for FIGS. 4-5 including any of the variations mentioned therefor, although the scope of the invention is not so limited.

The illustrated method involves architectural operations (e.g., those visible from a software perspective). In other embodiments, the method may optionally include one or more microarchitectural operations. By way of example, the instruction may be fetched, decoded, scheduled out-of-order, source operands may be accessed, an execution unit may perform microarchitectural operations to implement the instruction, etc. In some embodiments, the microarchitectural operations to implement the instruction may optionally include any of those shown or described for FIG. 4 and/or FIG. 5, although the scope of the invention is not so limited.

In some embodiments, the data elements may represent memory address related indices of the type commonly used by gather from memory and/or scatter to memory instructions. In such cases, restrictions may be placed on the values of such memory address related indices. Whereas gather from memory and/or scatter to memory instructions may allow a greater range, the memory addresses related indices for these instructions may be constrained to a smaller range, such as, for example, to not go beyond the SIMD width and/or number of data elements in the result. In one aspect, only the $\log_2$ VLEN bits of the memory address related indices may be used. In another aspect, a check could optionally be performed to determine whether the memory address related indices are out of bounds and if so signal an exceptional condition (e.g., a fault).

Figure 7:
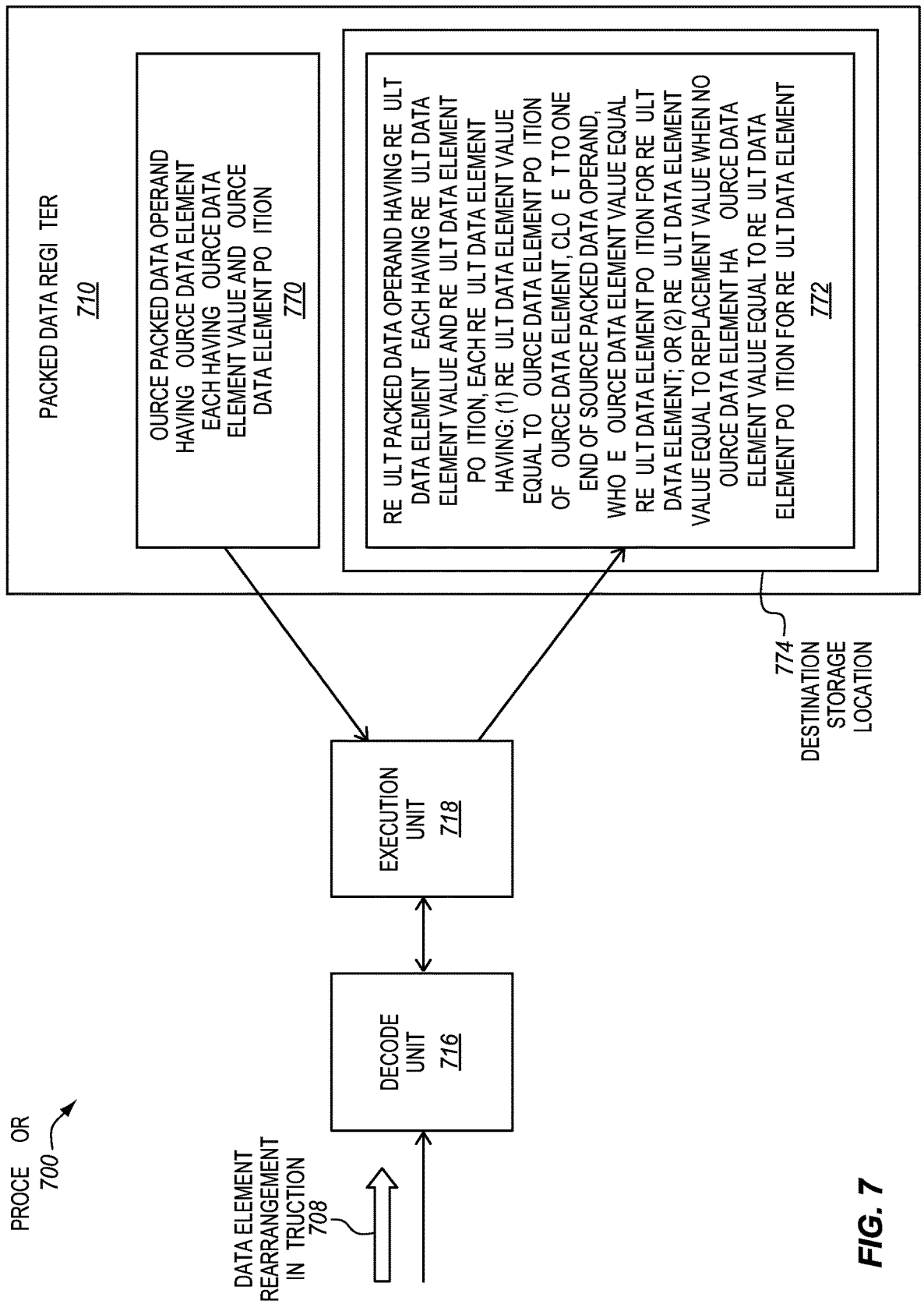
FIG. 7 is a block diagram of an embodiment of a processor that is operative to perform an embodiment of a data rearrangement instruction.

FIG. 7 is a block diagram of an embodiment of a processor 700 that is operative to perform an embodiment of a data rearrangement instruction 708. In embodiments, the processor 300 may be, or may be included in, the processor 100 of FIG. 1 and/or the processor 300 of FIG. 3. The components, features, and specific optional details described herein for the processor 100 and/or the 300 optionally apply to the processor 700. Alternatively, the processor 700 may be, or may be included in, a similar or different processor than the processors 100 and 300. Moreover, the processors 100 and 300 may either be or include a similar or different processor than the processor 700.

During operation, the processor 700 may receive the data rearrangement instruction 708. In some embodiments, the data rearrangement instruction may explicitly specify (e.g., through one or more fields or a set of bits), or otherwise indicate (e.g., implicitly indicate), a source packed data operand 770 having a plurality of source packed data elements (e.g., at least four, eight, sixteen, thirty two, or optionally more). In some embodiments, the source data elements may be indices arranged in a scatter pattern, although the scope of the invention is not so limited. In other embodiments, the source data elements may be indices arranged in a gather pattern, although the scope of the invention is not so limited. The data rearrangement instruction may also explicitly specify or otherwise indicate a destination storage location 774 where a result packed data operand 774 is to be stored in response to the instruction being performed. As one example, the instruction may have source and/or destination operand specification fields to specify packed data registers or other storage locations for the source and/or destination operands. Alternatively, one or more of these operands may optionally be implicit to the instruction (e.g., implicit to an opcode of the instruction). As one specific example, a source/destination storage location that may be explicitly specified once and implicitly or impliedly understood to be used for both the source packed data operand and as the destination storage location to store the result packed data operand.

Referring again to FIG. 7, the processor 700 also includes a set of packed data registers 710. The packed data registers 710 may optionally be similar to, or the same as, the previously described packed data registers 310. As shown, in some embodiments, the source packed data operand 770 may optionally be stored in the set of packed data registers (e.g., in a first packed data register), and the destination storage location 774 may also optionally be in the set of packed data registers (e.g., either the first packed data register or a different packed data register). Alternatively, memory locations, or other storage locations, may optionally be used for one or more of the source and destination operands.

In some embodiments, each source data element of the source packed data operand 770 may have a corresponding source data element value, such as, for example, an integer index value to indicate a data element position or another numerical value. In some embodiments, each source data element may also have a corresponding source data element position. In one aspect, the source data element positions may be relative to a first end of the source packed data operand (e.g., a least significant end or a most significant end). For example, a least significant source data element may have a lowest numbered position (e.g., 0), a next-to-least significant source data element may have a next-to-lowest numbered position (e.g., 1), and so on.

Referring again to FIG. 7, the processor includes a decode unit 716. The decode unit may receive and decode the data rearrangement instruction 708. The decode unit 716 may optionally be similar to, or the same as, the previously described decode unit 316. Also, as previously mentioned, the data element rearrangement instruction may also optionally be converted by an instruction converter into one or more other instructions that may then be decoded by the decode unit.

An execution unit 718 is coupled with the decode unit 716 and is coupled with the packed data registers 710. The execution unit 718 may optionally be similar to, or the same as, the previously described execution unit 718. The execution unit may receive one or more decoded or otherwise converted instructions or control signals that represent and/or are derived from the data rearrangement instruction. The execution unit may also receive the source packed data operand 770. The execution unit may be operative in response to and/or as a result of the data rearrangement instruction (e.g., in response to one or more instructions or control signals decoded therefrom) to store the result packed data operand 772 in the destination storage location 774. The result packed data operand may include a plurality of result data elements (e.g., at least four, eight, sixteen, thirty two, or optionally more).

In some embodiments, each of the result data elements may have a result data element value and a result data element position relative to a first end of the result packed data operand (e.g., a least significant end or a most significant end). In some embodiments, the same ends (e.g., the least significant ends) may be used for both the source packed data operand and the result packed data operand as reference points for the relative data element positions.

In each embodiments, each result data element may have a result data element value equal to a source data element position of a source data element, which is closest to one end of the source packed data operand, whose source data element value is equal to the result data element position for the result data element, as long as at least one source data element has a source data element value that equals the result data element position for that result data element. In some embodiments, the referred to one end of the source packed data operand may be a most significant end of the source packed data operand, or alternatively a least significant end of the source packed data operand. Conversely, in some embodiments, each result data element may have a result data element value equal to a replacement value, when no source data element has a source data element value that equals the result data element position for that result data element.

One example of a suitable replacement value is a zero value. Another example of a suitable replacement value is a merged value (e.g., a value stored in a corresponding data element position in the destination storage location just prior to execution of the data element rearrangement instruction). Yet another example of a suitable replacement value is a negative value (e.g., any desired negative integer value). A still further example of a suitable replacement value is a large value (e.g., a value larger than that which would be used as an index and/or larger than the number of data elements in the source packed data operand). Alternatively, various other types of values may optionally be used as replacement values. In some embodiments, the result data elements may be indices arranged in a gather by indices to register pattern relative to indices of the source packed data operand which are arranged in a scatter by indices to register pattern, although the scope of the invention is not so limited.

In other embodiments, the result data elements may be indices arranged in a scatter by indices to register pattern relative to indices of the source packed data operand which are arranged in a gather by indices to register pattern, although the scope of the invention is not so limited. In some embodiments, the result packed data operand may be any of those shown and described for FIGS. 8-10, including any of the variations mentioned therefor, although the scope of the invention is not so limited.

Figure 8:
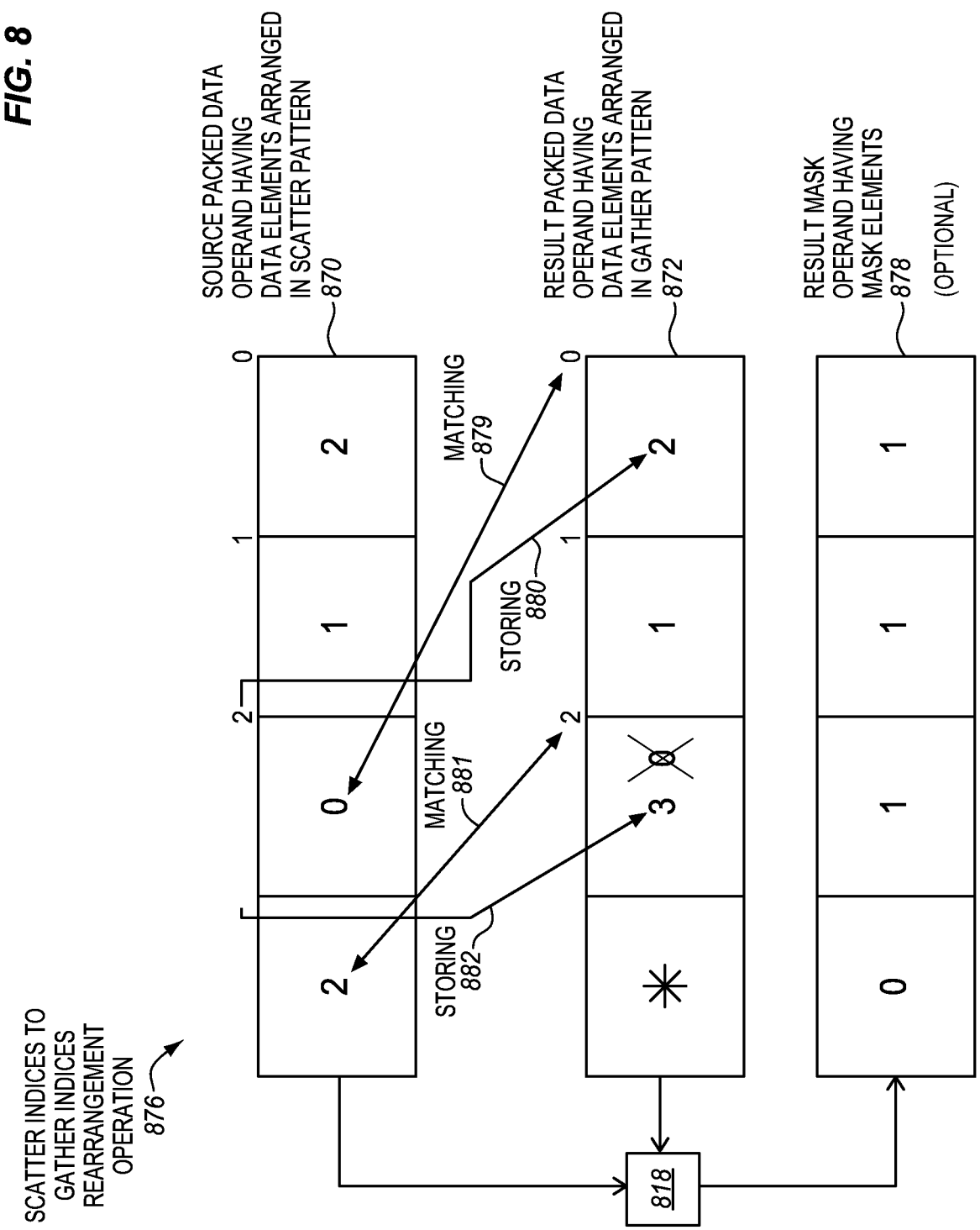
FIG. 8 is a block diagram of a first example embodiment of a data element rearrangement operation.

FIG. 8 is a block diagram illustrating an example embodiment of a scatter indices to gather indices rearrangement operation 876 that may be performed in response to an embodiment of a scatter indices to gather indices rearrangement instruction (e.g., instruction 108 and/or 708). The operation may be performed by any of the various processors disclosed herein (e.g., the processor 100 and/or 700).

The instruction may specify (e.g., explicitly specify) or otherwise indicate (e.g., implicitly indicate) a source packed data operand 870 having a plurality of source data elements. Each of the source data elements has a source data element value and a source data element position relative to an end of the source packed data operand. In the illustration, the least significant or lowest order position is shown on the right and the most significant or highest order position is shown on the left. In the illustrated example, the source data element values, when read from right to left (e.g., least significant to most significant positions), are 2, 1, 0, and 2. In the illustrated example, the source data element positions, from right to left (e.g., relative to the least significant end), are 0, 1, 2, and 3. Without limitation, the source data elements may represent integers, fixed-point elements, floating-point elements, or other types of data. In some embodiments, the source data element values may represent integer indices (e.g., for a scatter by indices operation), although the scope of the invention is not so limited.

In the illustrated embodiment, there are only four source data elements. However, in other embodiments, more source data elements may optionally be used. Commonly, the number of source data elements in the source packed data operand may be equal to the size in bits of the source packed data operand divided by the size in bits of a single data element. In various embodiments, the size or width of the source packed data operand may be 64-bits, 128-bits, 256-bits, 512-bits, or 1024-bits, although the scope of the invention is not so limited. In various embodiments, the size or width of each data element may be 8-bits, 16-bits, 32-bits, or 64-bits, although the scope of the invention is not so limited. Other packed data operand sizes and data element sizes are also suitable. In various embodiments, there may be at least four, at least eight, at least sixteen, at least thirty-two, at least sixty-four, or at least one hundred twenty eight data elements in the source packed data operand.

A result packed data operand 872 may be generated and stored (e.g., by an execution unit 818) in a destination storage location in response to the instruction and/or operation. The source packed data operand may be input to the execution unit (e.g., from a packed data register), and the execution unit responsive to the instruction/operation may generate and store the result packed data operand to the destination storage location (e.g., a packed data register). The result packed data operand may have a plurality of result data elements (e.g., a same number of data elements as the source packed data operand). In this illustrate example, the result packed data operand has only four result data elements.

In some embodiments, each of the result data elements may have a result data element value and a result data element position relative to an end of the result packed data operand. In the illustration, the least significant or lowest order position is shown on the right and the most significant or highest order position is shown on the left. In the illustrated example, the result data element values, when read from right to left (e.g., least significant to most significant positions), are 2, 1, 3, and *, where the asterisk (*) may represent a replacement value. In the illustrated example, the result data element positions, from right to left (e.g., relative to the least significant end), are 0, 1, 2, and 3. Without limitation, the source data elements may represent integers, fixed-point elements, floating-point elements, or other types of data. In some embodiments, the source data element values may represent integer indices (e.g., for a gather by indices operation), although the scope of the invention is not so limited.

In each embodiments, each result data element may have a result data element value equal to a source data element position of a source data element, which is closest to one end of the source packed data operand, whose source data element value is equal to the result data element position for the result data element, as long as at least one source data element has a source data element value that equals the result data element position for that result data element. For example, a first arrow 879 shows that a next-to-most significant source data element (i.e., the third from the right) at source data element position two (2) has a source data element value of zero (0) which matches (e.g., is equal to) the result data element position of zero (0) for the least significant result data element. Accordingly, as shown by a second arrow 880, the least significant result data element may have a result data element value of two (2) which is equal to the source data element position of two (2) of the next-to-most significant source data element. As another example, a third arrow 881 shows that a most significant source data element at source data element position three (3) has a source data element value of two (2) which matches (e.g., is equal to) the result data element position of two (2) for the next-to-most significant result data element (i.e., the third from the right). Accordingly, as shown by a fourth arrow 882, the next-to-most significant result data element may have a result data element value of three (3) which is equal to the source data element position of three (3) of the most significant source data element.

In some embodiments, there may be one or more sets of source data elements with identical or duplicate source data element values. For example, as shown in the illustrated example embodiment, both the least significant (in this case rightmost) source data element, as well as the most significant (in this case leftmost) source data element, have source data element values of two (2). However, only one value may be stored to the result data element in result data element position two (2). In some embodiments, in order to decide which it should be, a convention may be followed. For example, the source data element closest to one end of the source packed data operand may be chosen. For example, as shown in the illustrated example, the source data elements closest to the most significant end of the source packed data operand may be chosen. Such a convention may be similar to that employed by other instructions, such as, for example, scatter to memory instructions, vector conflict instructions, and the like, and may therefore potentially be more compatible with algorithms employing such instructions, but is not required. As shown by an "X" through a value zero (0) in the next-to-most significant result data element, the data element position of zero (0) is not stored to the next-to-most significant result data element in this example. Rather, in this embodiment, the source data element position is chosen for the source data element, which is closest to the most significant end of the source packed data operand, and so the source data element position of the most significant source data element instead of the least significant data element is used. Alternatively, the source data elements closest to the least significant end of the source packed data operand may optionally be chosen, if desired.

In addition, the presence of duplicate source data element values may tend to create vacancies or "holes," which may represent result data element positions for which no source data element values equal. For example, assuming the number of source and result elements match, each duplicate source data element value may tend to lead to a corresponding result data element vacancy. In the illustrated example, the most significant (in this case leftmost) result data element at data element position three (3) has an asterisk (*) to indicate such a vacancy or hole. As shown, none of the source data elements has a source data element value of three (3) or in other words none of 2, 1, 0, or 2 equal 3. In some embodiments, a replacement value may be stored in each of such vacancies or holes. The types of replacement values previously described in conjunction with FIG. 7 are generally suitable.

Referring again to FIG. 8, in some embodiments, an optional a result mask operand 878 may be generated and stored (e.g., by an execution unit 818) in a destination storage location in response to the instruction and/or operation. In some embodiments, the destination storage location may be an architectural set of mask registers (e.g., the packed data operation mask registers 114, k-mask registers disclosed elsewhere herein, etc.). Alternatively, a general-purpose register, a packed data register, or another storage location may optionally be used. The result mask operand may have a plurality of mask elements (e.g., a same number of mask elements as the number of data elements in the result packed data operand). In this illustrate example, the result mask operand has four mask elements.

In some embodiments, the mask operand may represent a packed data operation mask operand that may be indicated by a subsequent masked packed data instruction to perform a masked packed data operation. The mask operand may also be referred to herein simply as an operation mask, predicate mask, or mask. The mask may represent a predicate operand or conditional control operand that may be used to predicate, conditionally control, or mask whether or not corresponding operations are to be performed and/or corresponding results are to be stored. In some embodiments, the masking or predication may be at per-data element granularity such that operations on different pairs of corresponding data elements may be predicated or conditionally controlled separately and/or independently of others. The mask may include multiple mask elements, predicate elements, or conditional control elements. In one aspect, the mask elements may be included in a one-to-one correspondence with corresponding source data elements and/or corresponding result data elements. As shown, in some embodiments, each mask element may be a single mask bit. Alternatively, each of the mask elements may be a data element of the same or different size as the result data elements. In still other embodiments, each of the mask elements may be a single bit of a data element (e.g., a most significant bit or a least significant bit).

In some embodiments, a value of each mask bit or other mask element may be operative to control whether or not a corresponding operation is to be performed and/or a corresponding result data element is to be stored. Each mask bit may have a first value to allow the operation to be performed and allow the corresponding result data element to be stored in the destination, or may have a second different value to not allow the operation to be performed and/or not allow the corresponding result data element to be stored in the destination. According to one possible convention, as shown in the illustration, a mask bit cleared to binary zero (i.e., 0) may represent a masked out operation that is not to be performed and/or is not to generate a result element, whereas a mask bit set to binary one (i.e., 1) may represent an unmasked operation that is to be performed to generate a result element. The opposite convention is also possible.

In some embodiments, when at least one source data element has a source data element value that equals a result data element position for a result data element, the corresponding mask element, which is in a same relative position as that result data element, may be unmasked (e.g., in the illustration have a value of one). Conversely, when no source data element has a source data element value that equals a result data element position for a result data element, the corresponding mask element (e.g., in a same relative position as that result data element) may be masked (e.g., in the illustration have a value of zero). In other words, each mask element corresponding to a result data element with a replacement value may be masked.

To further illustrate certain concepts, the discussion of FIG. 8 referred to conversion of scatter indices to gather indices. However, the same general approach may also be used to convert gather indices to scatter indices. Accordingly, in one aspect, such a data element rearrangement instruction and/or operation may be used to rearrange scatter indices to gather indices and/or gather indices to scatter indices.

Figure 9:
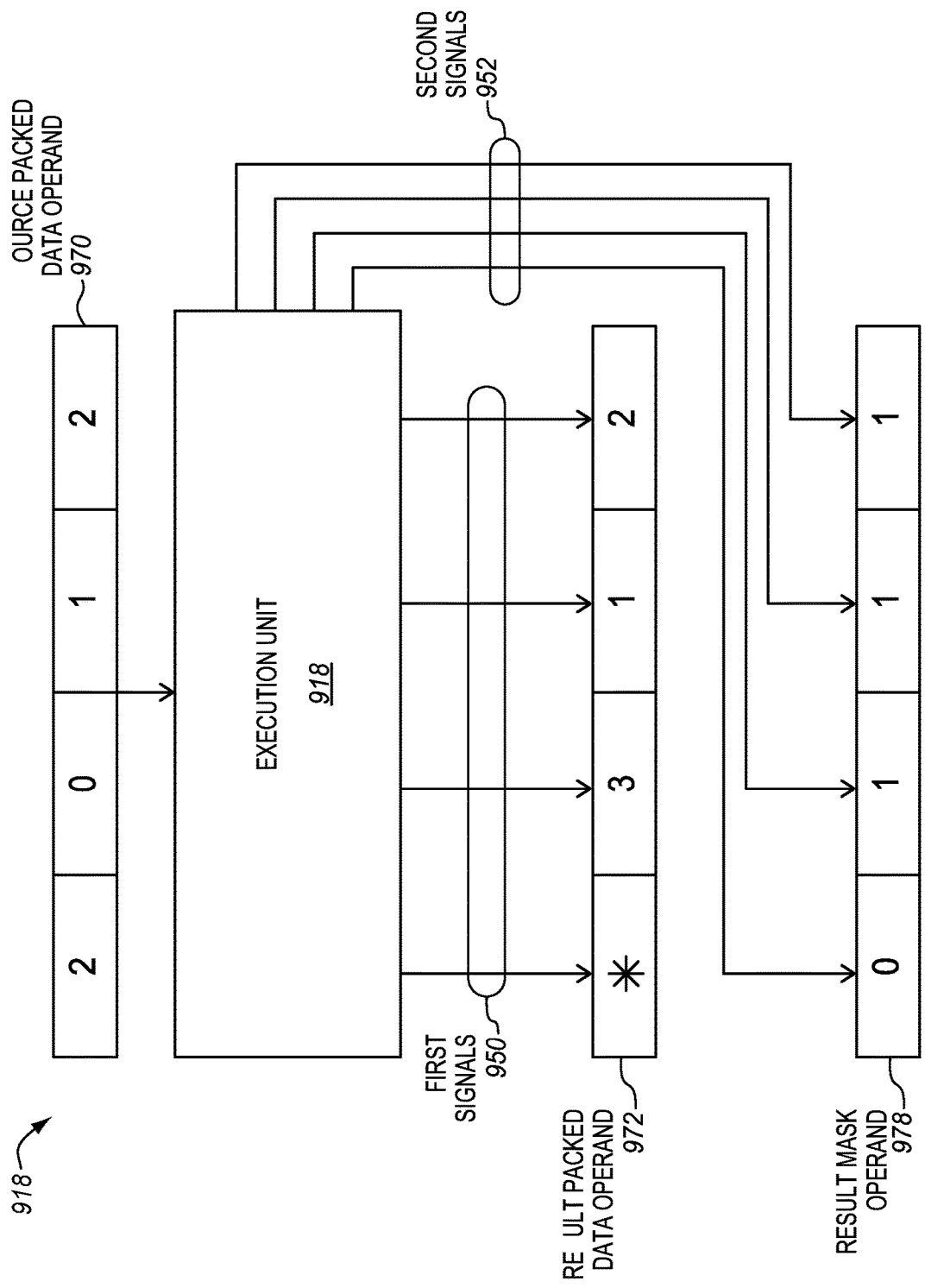
FIG. 9 is a block diagram of a detailed example embodiment of a data element rearrangement execution unit.

FIG. 9 is a block diagram of a detailed example embodiment of a data element rearrangement execution unit 918 that is suitable to implement an embodiment of a data element rearrangement instruction (e.g., a scatter indices to gather indices rearrangement instruction). The execution unit 918 may be similar to the execution unit 518 and may have similar features. To avoid obscuring the description, the different and/or additional features will primarily be described without repeating all the optionally similar features.

The execution unit may receive a source packed data operand 970. In this example, for ease of illustration, the source packed operand has only four data elements, although other numbers of data elements described elsewhere herein (e.g., eight, sixteen, thirty two, sixty four, one hundred twenty eight, etc.) may optionally be used in other embodiments. In the illustrated embodiment, the four indices have the values, from right to left, of 2, 1, 0, and 2, although these are only examples.

The execution unit may include similar logic to that previously described for the execution unit 518 to generate a first set of signals 950 (e.g., which may be similar to the first set of signals 550) and a second set of signals 952 (e.g., which may be similar to the second set of signals 552). For example, the execution unit 918 may include a full input crossbar, comparators, no-match detection units, etc. Each of the first set of signals 950 may have a value or indication that may be used to generate result data element value for a different corresponding result data element of a result packed data operand 972. Each of the second set of signals 952 may have a value or indication that may be used to generate a mask value of a different corresponding mask element of a result mask operand 978.

Figure 10:
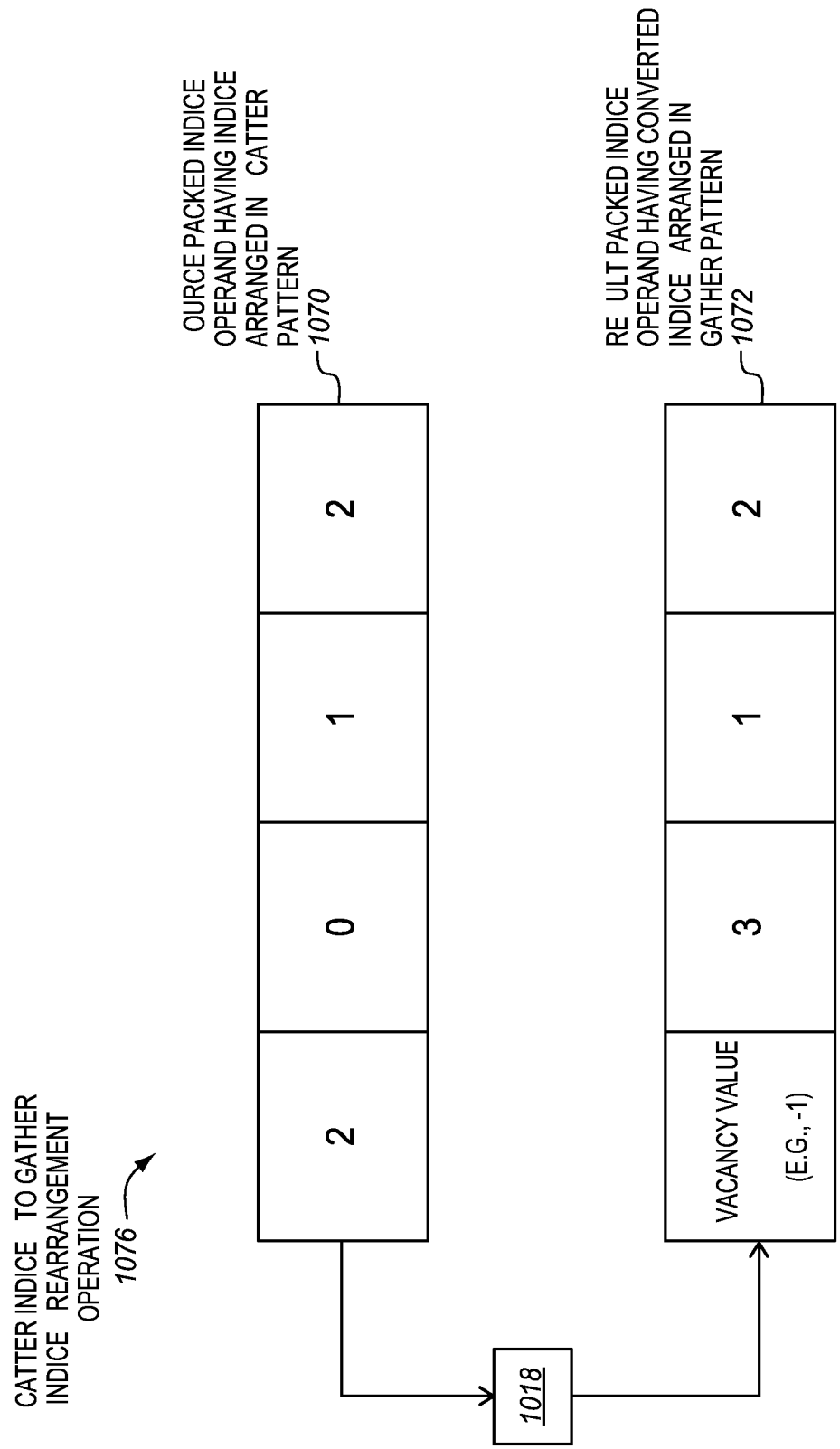
FIG. 10 is a block diagram of a second example embodiment of a data element rearrangement operation.

FIG. 10 is a block diagram illustrating an example embodiment of a scatter indices to gather indices rearrangement operation 1076 that may be performed in response to an embodiment of a scatter indices to gather indices rearrangement instruction (e.g., instruction 108 and/or 708). The operation may be performed by any of the various processors disclosed herein (e.g., the processor 100 and/or 700). The operation 1076 is similar to the operation 876 previously described for FIG. 8 and may have similar characteristics and variations. To avoid obscuring the description the different and/or additional characteristics of the operation 1076 will primarily be described without repeating all of the optionally similar characteristics and variations.

As previously described, the instruction may specify (e.g., explicitly specify) or otherwise indicate (e.g., implicitly indicate) a source packed data operand 1070, and in response to the instruction/operation a result packed data operand 1072 may be generated. However, in the embodiment of the operation 1076, a result mask operand is not generated. Rather, in this embodiment, when no source data element has a source data element value that equals a result data element position for a result data element, the result data element may have as a replacement or vacancy value a value that can be distinguished from all other result data elements not having such a replacement or vacancy value. For example, in some embodiments, each such replacement or vacancy value may be a negative number whereas all other result data elements may have a positive number. As another example, in some embodiments, each such replacement or vacancy value may be a large number (e.g., greater than that which would be used for gather or scatter indices) whereas all other result data elements may have smaller number of size suitable for gather or scatter indices. In still other embodiments, some other predetermined value capable of being distinguished from non-replacement values of data elements rearranged from the source operand into the result operand may optionally be used. By way of example, software may use such values to distinctive values in a test before using the indices to control a gather by indices to register operation.

FIG. 11 is a block flow diagram illustrating an example embodiment of a method 1180 in a processor of performing a scatter by indices to register routine. At block 1181, a scatter indices to gather indices rearrangement instruction may be received. The instruction may indicate a first packed data register having a source packed indices operand that has indices arranged in a scatter pattern. The instruction may also indicate a second packed data register as a destination operand. In some embodiments, the instruction may optionally indicate a mask register as a destination operand.

At block 1182, a result packed indices operand may be stored in the second packed data register in response to the scatter indices to gather indices rearrangement instruction. In some embodiments, the result packed indices operand may have indices arranged in a gather pattern. In some embodiments, a result mask operand may optionally be stored in the mask register in response to the scatter indices to gather indices rearrangement instruction. In some embodiments, the result packed indices operand may indicate vacancies (e.g., have masked out values for vacancies).

At block 1183, a gather by indices to register instruction may be received. The gather by indices to register instruction may indicate a third packed data register as a source packed data operand, and may indicate the second packed data register as a source packed indices operand with the indices arranged in the gather pattern. In some embodiments, the gather by indices to register instruction may optionally indicate a mask register as a source mask operand. The gather by indices to register instruction may also indicate a fourth packed data register as a destination operand.

At block 1184, a result packed data operand may be stored in the fourth packed data register in response to the gather by indices to register instruction. The result packed data operand may have data elements gathered from the third packed data register using indices from the second packed data register. In some embodiments, the gather by indices to register instruction may optionally be a masked or predicated gather by indices to register instruction and the data elements may be gathered from the third packed data register using indices from the second packed data register optionally subject to masking or predication by the optional source mask operand.

Advantageously, the scatter indices to gather indices rearrangement instruction may allow indices to be rearranged to a format suitable for the gather by indices to register instruction (e.g., so that an existing instruction and/or microarchitectural implementation may be leveraged to perform a scatter by indices to register operation). For ease of description, the method 1180 is described as using different registers, although it is to be appreciated that the same register may be used for multiple of the described operands.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 12A illustrates an exemplary AVX instruction format including a VEX prefix 1202, real opcode field 1230, Mod R/M byte 1240, SIB byte 1250, displacement field 1262, and IMM8 1272. FIG. 12B illustrates which fields from FIG. 12A make up a full opcode field 1274 and a base operation field 1242. FIG. 12C illustrates which fields from FIG. 12A make up a register index field 1244.

VEX Prefix (Bytes 0-2) 1202 is encoded in a three-byte form. The first byte is the Format Field 1240 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 1205 (VEX Byte 1, bits [7-5]) consists of a VEX.R bit field (VEX Byte 1, bit [7]—R), VEX.X bit field (VEX byte 1, bit [6]—X), and VEX.B bit field (VEX byte 1, bit[5]—B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 1215 (VEX byte 1, bits [4:0]—mmmmm) includes content to encode an implied leading opcode byte. W Field 1264 (VEX byte 2, bit [7]—W)—is represented by the notation VEX.W, and provides different functions depending on the instruction. The role of VEX.vvvv 1220 (VEX Byte 2, bits [6:3]-vvvv) may include the following: 1) VEX.vvvv encodes the first source register operand, specified in inverted (1 s complement) form and is valid for instructions with 2 or more source operands; 2) VEX.vvvv encodes the destination register operand, specified in 1 s complement form for certain vector shifts; or 3) VEX.vvvv does not encode any operand, the field is reserved and should contain 1211b. If VEX.L 1268 Size field (VEX byte 2, bit [2]-L)=0, it indicates 128 bit vector; if VEX.L=1, it indicates 256 bit vector. Prefix encoding field 1225 (VEX byte 2, bits [1:0]-pp) provides additional bits for the base operation field.

Real Opcode Field 1230 (Byte 3) is also known as the opcode byte. Part of the opcode is specified in this field.

MOD R/M Field 1240 (Byte 4) includes MOD field 1242 (bits [7-6]), Reg field 1244 (bits [5-3]), and R/M field 1246 (bits [2-0]). The role of Reg field 1244 may include the following: encoding either the destination register operand or a source register operand (the rrr of Rrrr), or be treated as an opcode extension and not used to encode any instruction operand. The role of R/M field 1246 may include the following: encoding the instruction operand that references a memory address, or encoding either the destination register operand or a source register operand.

Scale, Index, Base (SIB)—The content of Scale field 1250 (Byte 5) includes SS1252 (bits [7-6]), which is used for memory address generation. The contents of SIB.xxx 1254 (bits [5-3]) and SIB.bbb 1256 (bits [2-0]) have been previously referred to with regard to the register indexes Xxxx and Bbbb.

The Displacement Field 1262 and the immediate field (IMM8) 1272 contain address data.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 13A:
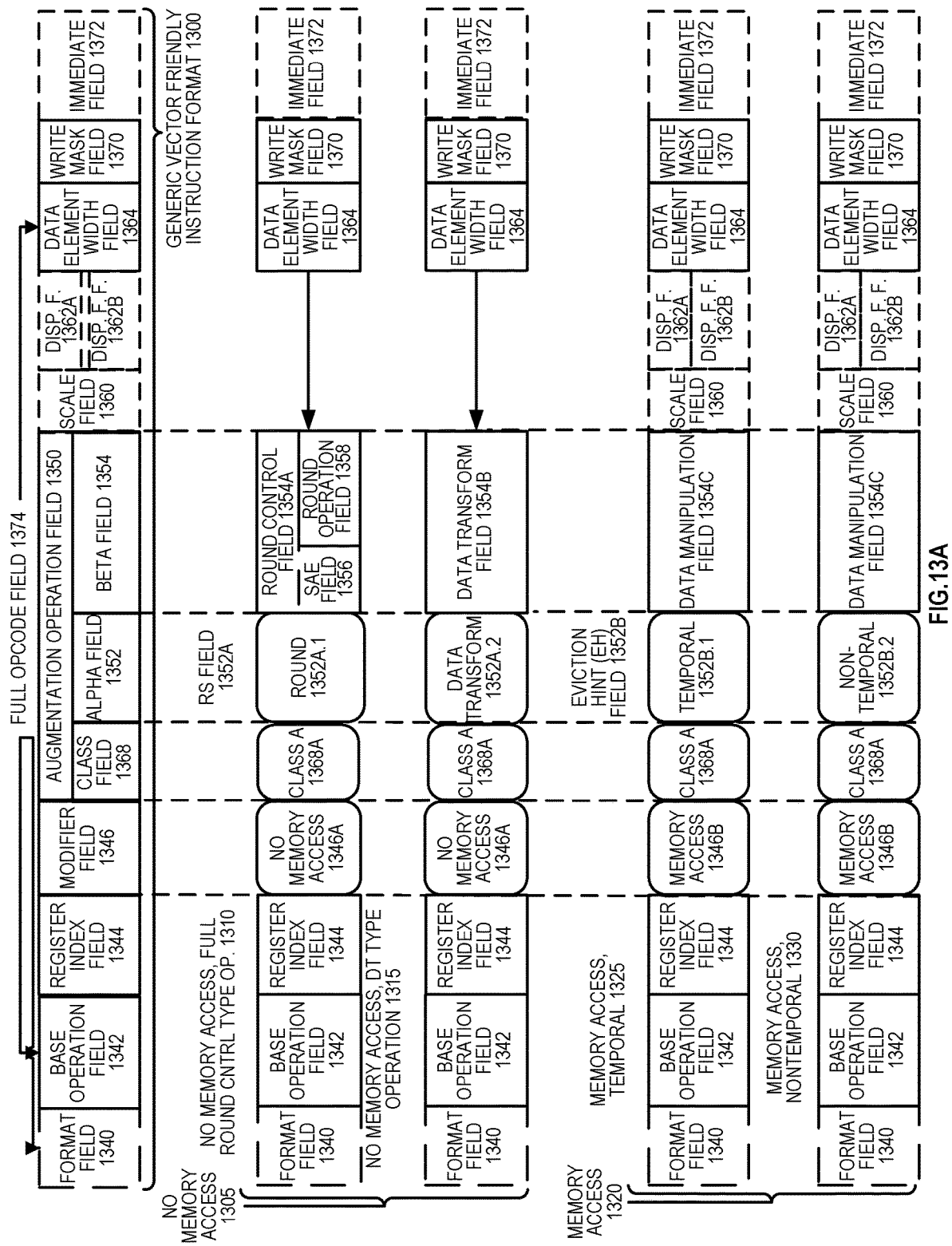
FIG. 13A-B is a block diagram illustrating an exemplary specific vector friendly instruction format and an opcode field, according to embodiments of the invention.
Figure 13B:
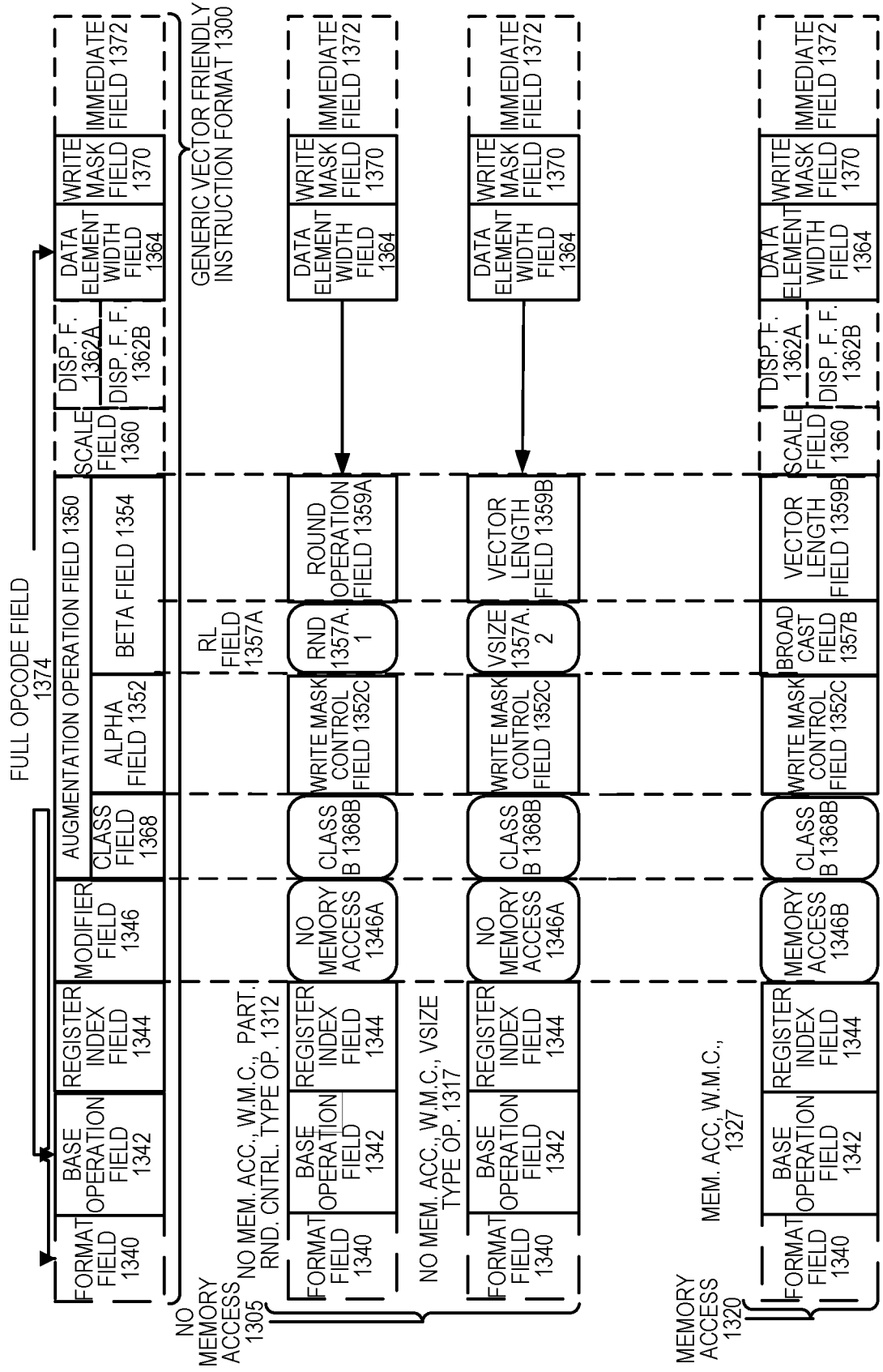

FIGS. 13A-13B are block diagrams illustrating a generic vector friendly instruction format and instruction templates thereof according to embodiments of the invention. FIG. 13A is a block diagram illustrating a generic vector friendly instruction format and class A instruction templates thereof according to embodiments of the invention; while FIG. 13B is a block diagram illustrating the generic vector friendly instruction format and class B instruction templates thereof according to embodiments of the invention. Specifically, a generic vector friendly instruction format 1300 for which are defined class A and class B instruction templates, both of which include no memory access 1305 instruction templates and memory access 1320 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 13A include: 1) within the no memory access 1305 instruction templates there is shown a no memory access, full round control type operation 1310 instruction template and a no memory access, data transform type operation 1315 instruction template; and 2) within the memory access 1320 instruction templates there is shown a memory access, temporal 1325 instruction template and a memory access, non-temporal 1330 instruction template. The class B instruction templates in FIG. 13B include: 1) within the no memory access 1305 instruction templates there is shown a no memory access, write mask control, partial round control type operation 1312 instruction template and a no memory access, write mask control, vsize type operation 1317 instruction template; and 2) within the memory access 1320 instruction templates there is shown a memory access, write mask control 1327 instruction template.

The generic vector friendly instruction format 1300 includes the following fields listed below in the order illustrated in FIGS. 13A-13B.

Format field 1340—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1342—its content distinguishes different base operations.

Register index field 1344—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1346—its content distinguishes occurrences of instructions in the generic vector instruction format that specify memory access from those that do not; that is, between no memory access 1305 instruction templates and memory access 1320 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1350—its content distinguishes which one of a variety of different operations to be performed in addition to the base operation. This field is context specific. In one embodiment of the invention, this field is divided into a class field 1368, an alpha field 1352, and a beta field 1354. The augmentation operation field 1350 allows common groups of operations to be performed in a single instruction rather than 2, 3, or 4 instructions.

Scale field 1360—its content allows for the scaling of the index field's content for memory address generation (e.g., for address generation that uses $2^{scale}*\text{index}+\text{base}$).

Displacement Field 1362A—its content is used as part of memory address generation (e.g., for address generation that uses $2^{scale}*\text{index}+\text{base}+\text{displacement}$).

Displacement Factor Field 1362B (note that the juxtaposition of displacement field 1362A directly over displacement factor field 1362B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1374 (described later herein) and the data manipulation field 1354C. The displacement field 1362A and the displacement factor field 1362B are optional in the sense that they are not used for the no memory access 1305 instruction templates and/or different embodiments may implement only one or none of the two.

Data element width field 1364—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1370—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1370 allows for partial vector operations, including loads, stores, arithmetic, logical, etc. While embodiments of the invention are described in which the write mask field's 1370 content selects one of a number of write mask registers that contains the write mask to be used (and thus the write mask field's 1370 content indirectly identifies that masking to be performed), alternative embodiments instead or additional allow the mask write field's 1370 content to directly specify the masking to be performed.

Immediate field 1372—its content allows for the specification of an immediate. This field is optional in the sense that is it not present in an implementation of the generic vector friendly format that does not support immediate and it is not present in instructions that do not use an immediate.

Class field 1368—its content distinguishes between different classes of instructions. With reference to FIGS. 13A-B, the contents of this field select between class A and class B instructions. In FIGS. 13A-B, rounded corner squares are used to indicate a specific value is present in a field (e.g., class A 1368A and class B 1368B for the class field 1368 respectively in FIGS. 13A-B).

Instruction Templates of Class A

In the case of the non-memory access 1305 instruction templates of class A, the alpha field 1352 is interpreted as an RS field 1352A, whose content distinguishes which one of the different augmentation operation types are to be performed (e.g., round 1352A.1 and data transform 1352A.2 are respectively specified for the no memory access, round type operation 1310 and the no memory access, data transform type operation 1315 instruction templates), while the beta field 1354 distinguishes which of the operations of the specified type is to be performed. In the no memory access 1305 instruction templates, the scale field 1360, the displacement field 1362A, and the displacement scale filed 1362B are not present.

No-Memory Access Instruction Templates—Full Round Control Type Operation

In the no memory access full round control type operation 1310 instruction template, the beta field 1354 is interpreted as a round control field 1354A, whose content(s) provide static rounding. While in the described embodiments of the invention the round control field 1354A includes a suppress all floating point exceptions (SAE) field 1356 and a round operation control field 1358, alternative embodiments may support may encode both these concepts into the same field or only have one or the other of these concepts/fields (e.g., may have only the round operation control field 1358).

SAE field 1356—its content distinguishes whether or not to disable the exception event reporting; when the SAE field's 1356 content indicates suppression is enabled, a given instruction does not report any kind of floating-point exception flag and does not raise any floating point exception handler.

Round operation control field 1358—its content distinguishes which one of a group of rounding operations to perform (e.g., Round-up, Round-down, Round-towards-zero and Round-to-nearest). Thus, the round operation control field 1358 allows for the changing of the rounding mode on a per instruction basis. In one embodiment of the invention where a processor includes a control register for specifying rounding modes, the round operation control field's 1350 content overrides that register value.

No Memory Access Instruction Templates—Data Transform Type Operation

In the no memory access data transform type operation 1315 instruction template, the beta field 1354 is interpreted as a data transform field 1354B, whose content distinguishes which one of a number of data transforms is to be performed (e.g., no data transform, swizzle, broadcast).

In the case of a memory access 1320 instruction template of class A, the alpha field 1352 is interpreted as an eviction hint field 1352B, whose content distinguishes which one of the eviction hints is to be used (in FIG. 13A, temporal 1352B.1 and non-temporal 1352B.2 are respectively specified for the memory access, temporal 1325 instruction template and the memory access, non-temporal 1330 instruction template), while the beta field 1354 is interpreted as a data manipulation field 1354C, whose content distinguishes which one of a number of data manipulation operations (also known as primitives) is to be performed (e.g., no manipulation; broadcast; up conversion of a source; and down conversion of a destination). The memory access 1320 instruction templates include the scale field 1360, and optionally the displacement field 1362A or the displacement scale field 1362B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1352 is interpreted as a write mask control (Z) field 1352C, whose content distinguishes whether the write masking controlled by the write mask field 1370 should be a merging or a zeroing.

In the case of the non-memory access 1305 instruction templates of class B, part of the beta field 1354 is interpreted as an RL field 1357A, whose content distinguishes which one of the different augmentation operation types are to be performed (e.g., round 1357A.1 and vector length (VSIZE)

1357A.2 are respectively specified for the no memory access, write mask control, partial round control type operation 1312 instruction template and the no memory access, write mask control, VSIZE type operation 1317 instruction template), while the rest of the beta field 1354 distinguishes which of the operations of the specified type is to be performed. In the no memory access 1305 instruction templates, the scale field 1360, the displacement field 1362A, and the displacement scale filed 1362B are not present.

In the no memory access, write mask control, partial round control type operation 1310 instruction template, the rest of the beta field 1354 is interpreted as a round operation field 1359A and exception event reporting is disabled (a given instruction does not report any kind of floating-point exception flag and does not raise any floating point exception handler).

Round operation control field 1359A—just as round operation control field 1358, its content distinguishes which one of a group of rounding operations to perform (e.g., Round-up, Round-down, Round-towards-zero and Round-to-nearest). Thus, the round operation control field 1359A allows for the changing of the rounding mode on a per instruction basis. In one embodiment of the invention where a processor includes a control register for specifying rounding modes, the round operation control field's 1350 content overrides that register value.

In the no memory access, write mask control, VSIZE type operation 1317 instruction template, the rest of the beta field 1354 is interpreted as a vector length field 1359B, whose content distinguishes which one of a number of data vector lengths is to be performed on (e.g., 128, 256, or 512 byte).

In the case of a memory access 1320 instruction template of class B, part of the beta field 1354 is interpreted as a broadcast field 1357B, whose content distinguishes whether or not the broadcast type data manipulation operation is to be performed, while the rest of the beta field 1354 is interpreted the vector length field 1359B. The memory access 1320 instruction templates include the scale field 1360, and optionally the displacement field 1362A or the displacement scale field 1362B.

With regard to the generic vector friendly instruction format 1300, a full opcode field 1374 is shown including the format field 1340, the base operation field 1342, and the data element width field 1364. While one embodiment is shown where the full opcode field 1374 includes all of these fields, the full opcode field 1374 includes less than all of these fields in embodiments that do not support all of them. The full opcode field 1374 provides the operation code (opcode).

The augmentation operation field 1350, the data element width field 1364, and the write mask field 1370 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 14 is a block diagram illustrating an exemplary specific vector friendly instruction format according to embodiments of the invention. FIG. 14 shows a specific vector friendly instruction format 1400 that is specific in the sense that it specifies the location, size, interpretation, and order of the fields, as well as values for some of those fields. The specific vector friendly instruction format 1400 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 13 into which the fields from FIG. 14 map are illustrated.

It should be understood that, although embodiments of the invention are described with reference to the specific vector friendly instruction format 1400 in the context of the generic vector friendly instruction format 1300 for illustrative purposes, the invention is not limited to the specific vector friendly instruction format 1400 except where claimed. For example, the generic vector friendly instruction format 1300 contemplates a variety of possible sizes for the various fields, while the specific vector friendly instruction format 1400 is shown as having fields of specific sizes. By way of specific example, while the data element width field 1364 is illustrated as a one bit field in the specific vector friendly instruction format 1400, the invention is not so limited (that is, the generic vector friendly instruction format 1300 contemplates other sizes of the data element width field 1364).

The generic vector friendly instruction format 1300 includes the following fields listed below in the order illustrated in FIG. 14A.

EVEX Prefix (Bytes 0-3) 1402—is encoded in a four-byte form.

Format Field 1340 (EVEX Byte 0, bits [7:0])—the first byte (EVEX Byte 0) is the format field 1340 and it contains 0×62 (the unique value used for distinguishing the vector friendly instruction format in one embodiment of the invention).

The second-fourth bytes (EVEX Bytes 1-3) include a number of bit fields providing specific capability.

REX field 1405 (EVEX Byte 1, bits [7-5])—consists of a EVEX.R bit field (EVEX Byte 1, bit [7]—R), EVEX.X bit field (EVEX byte 1, bit [6]—X), and 1357BEX byte 1, bit[5]—B). The EVEX.R, EVEX.X, and EVEX.B bit fields provide the same functionality as the corresponding VEX bit fields, and are encoded using 1 s complement form, i.e. ZMM0 is encoded as 1211B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1310—this is the first part of the REX' field 1310 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1415 (EVEX byte 1, bits [3:0]—mmmm)—its content encodes an implied leading opcode byte (0F, 0F 38, or 0F 3).

Data element width field 1364 (EVEX byte 2, bit [7]—W)—is represented by the notation EVEX.W. EVEX.W is used to define the granularity (size) of the datatype (either 32-bit data elements or 64-bit data elements).

EVEX.vvvv 1420 (EVEX Byte 2, bits [6:3]-vvvv)—the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in 1 s complement form for certain vector shifts; or 3) EVEX.vvvv does not encode any operand, the field is reserved and should contain 1211b. Thus, EVEX.vvvv field 1420 encodes the 4 low-order bits of the first source register specifier stored in inverted (1 s complement) form. Depending on the instruction, an extra different EVEX bit field is used to extend the specifier size to 32 registers.

EVEX.U 1368 Class field (EVEX byte 2, bit [2]-U)—If EVEX.U=0, it indicates class A or EVEX.U0; if EVEX.U=1, it indicates class B or EVEX.U1.

Prefix encoding field 1425 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1352 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1354 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1310—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1370 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1430 (Byte 4) is also known as the opcode byte. Part of the opcode is specified in this field.

MOD R/M Field 1440 (Byte 5) includes MOD field 1442, Reg field 1444, and R/M field 1446. As previously described, the MOD field's 1442 content distinguishes between memory access and non-memory access operations. The role of Reg field 1444 can be summarized to two situations: encoding either the destination register operand or a source register operand, or be treated as an opcode extension and not used to encode any instruction operand. The role of R/M field 1446 may include the following: encoding the instruction operand that references a memory address, or encoding either the destination register operand or a source register operand.

Scale, Index, Base (SIB) Byte (Byte 6)—As previously described, the scale field's 1350 content is used for memory address generation. SIB.xxx 1454 and SIB.bbb 1456—the contents of these fields have been previously referred to with regard to the register indexes Xxxx and Bbbb.

Displacement field 1362A (Bytes 7-10)—when MOD field 1442 contains 10, bytes 7-10 are the displacement field 1362A, and it works the same as the legacy 32-bit displacement (disp32) and works at byte granularity.

Displacement factor field 1362B (Byte 7)—when MOD field 1442 contains 01, byte 7 is the displacement factor field 1362B. The location of this field is that same as that of the legacy x86 instruction set 8-bit displacement (disp8), which works at byte granularity. Since disp8 is sign extended, it can only address between −128 and 137 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1362B is a reinterpretation of disp8; when using displacement factor field 1362B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1362B substitutes the legacy x86 instruction set 8-bit displacement. Thus, the displacement factor field 1362B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1372 operates as previously described.

Full Opcode Field

FIG. 14B is a block diagram illustrating the fields of the specific vector friendly instruction format 1400 that make up the full opcode field 1374 according to one embodiment of the invention. Specifically, the full opcode field 1374 includes the format field 1340, the base operation field 1342, and the data element width (W) field 1364. The base operation field 1342 includes the prefix encoding field 1425, the opcode map field 1415, and the real opcode field 1430.

Register Index Field

FIG. 14C is a block diagram illustrating the fields of the specific vector friendly instruction format 1400 that make up the register index field 1344 according to one embodiment of the invention. Specifically, the register index field 1344 includes the REX field 1405, the REX' field 1410, the MODR/M.reg field 1444, the MODR/M.r/m field 1446, the VVVV field 1420, xxx field 1454, and the bbb field 1456.

alpha field 1352 (EVEX byte 3, bit [7]—EH) is interpreted as the eviction hint (EH) field 1352B and the beta field 1354 (EVEX byte 3, bits [6:4]—SSS) is interpreted as a three bit data manipulation field 1354C.

When U=1, the alpha field 1352 (EVEX byte 3, bit [7]—EH) is interpreted as the write mask control (Z) field 1352C. When U=1 and the MOD field 1442 contains 11 (signifying a no memory access operation), part of the beta field 1354 (EVEX byte 3, bit [4]—$S_0$) is interpreted as the RL field 1357A; when it contains a 1 (round 1357A.1) the rest of the beta field 1354 (EVEX byte 3, bit [6-5]—$S_{2-1}$) is interpreted as the round operation field 1359A, while when the RL field 1357A contains a 0 (VSIZE 1357.A2) the rest of the beta field 1354 (EVEX byte 3, bit [6-5]—$S_{2-1}$) is interpreted as the vector length field 1359B (EVEX byte 3, bit [6-5]—$L_{1-0}$). When U=1 and the MOD field 1442 contains 00, 01, or 10 (signifying a memory access operation), the beta field 1354 (EVEX byte 3, bits [6:4]—SSS) is interpreted as the vector length field 1359B (EVEX byte 3, bit [6-5]—$L_{1-0}$) and the broadcast field 1357B (EVEX byte 3, bit [4]—B).

Exemplary Register Architecture

Figure 15:
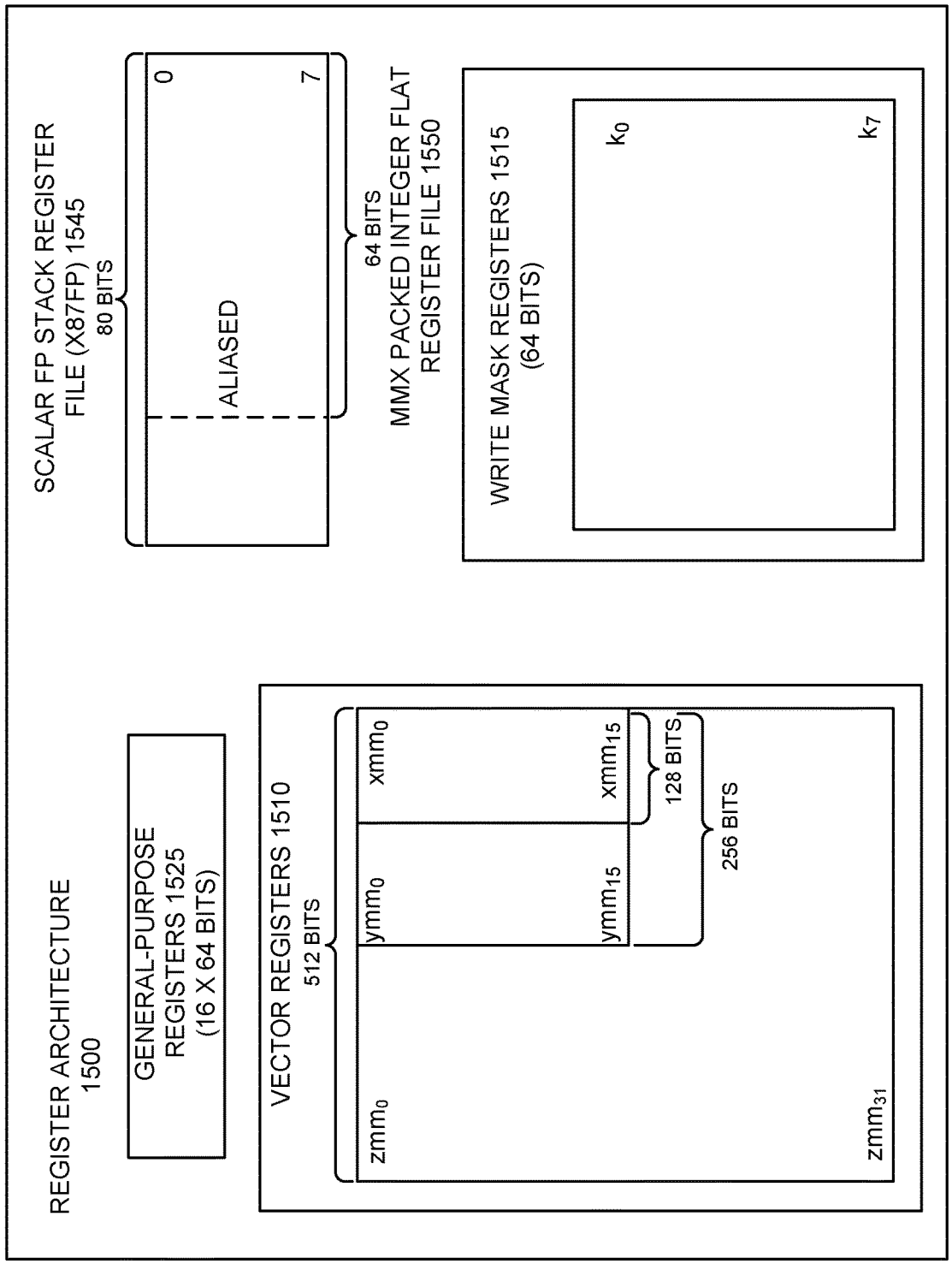
FIG. 15 is a block diagram of an embodiment of a register architecture.

FIG. 15 is a block diagram of a register architecture 1500 according to one embodiment of the invention. In the embodiment illustrated, there are 32 vector registers 1510 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1400 operates on these overlaid register file as illustrated in the below tables.

| Adjustable Vector Length | Class | Operations | Registers |
|---|---|---|---|
| Instruction Templates that do not include the vector length field 1359B | A (FIG. 13A; U = 0) | 1310, 1315, 1325, 1330 | zmm registers (the vector length is 64 byte) |
| | B (FIG. 13B; U = 1) | 1312 | zmm registers (the vector length is 64 byte) |
| Instruction templates that do include the vector length field 1359B | B (FIG. 13B; U = 1) | 1317, 1327 | zmm, ymm, or xmm registers (the vector length is 64 byte, 32 byte, or 16 byte) depending on the vector length field 1359B |

Augmentation Operation Field

Figure 14D:
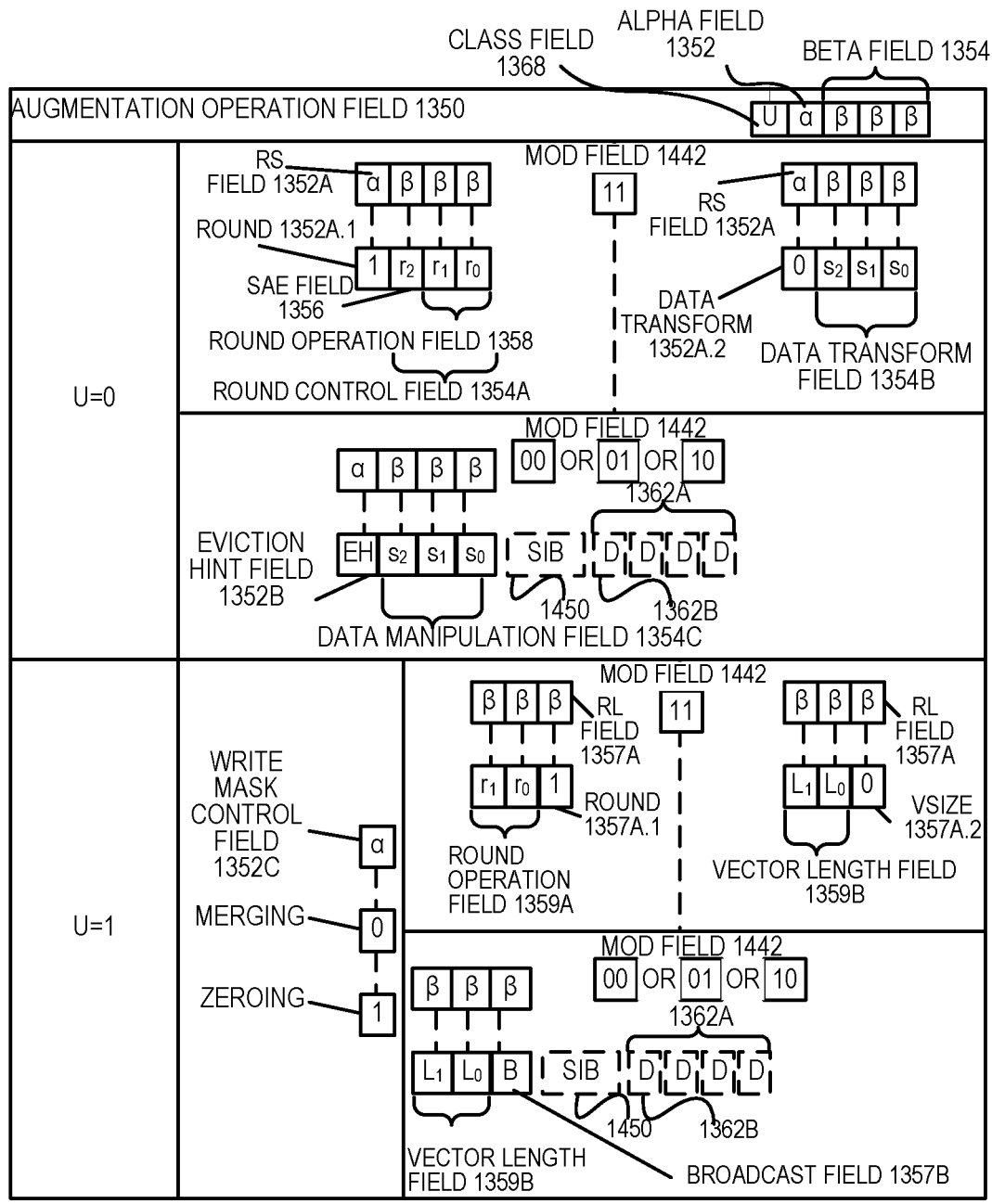

FIG. 14D is a block diagram illustrating the fields of the specific vector friendly instruction format 1400 that make up the augmentation operation field 1350 according to one embodiment of the invention. When the class (U) field 1368 contains 0, it signifies EVEX.U0 (class A 1368A); when it contains 1, it signifies EVEX.U1 (class B 1368B). When U=0 and the MOD field 1442 contains 11 (signifying a no memory access operation), the alpha field 1352 (EVEX byte 3, bit [7]—EH) is interpreted as the rs field 1352A. When the rs field 1352A contains a 1 (round 1352A.1), the beta field 1354 (EVEX byte 3, bits [6:4]—SSS) is interpreted as the round control field 1354A. The round control field 1354A includes a one bit SAE field 1356 and a two bit round operation field 1358. When the rs field 1352A contains a 0 (data transform 1352A.2), the beta field 1354 (EVEX byte 3, bits [6:4]—SSS) is interpreted as a three bit data transform field 1354B. When U=0 and the MOD field 1442 contains 00, 01, or 10 (signifying a memory access operation), the In other words, the vector length field 1359B selects between a maximum length and one or more other shorter lengths, where each such shorter length is half the length of the preceding length; and instructions templates without the vector length field 1359B operate on the maximum vector length. Further, in one embodiment, the class B instruction templates of the specific vector friendly instruction format 1400 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1515—in the embodiment illustrated, there are 8 write mask registers (k0 through k7), each 64 bits in size. In an alternate embodiment, the write mask registers 1515 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1545, on which is aliased the MMX packed integer flat register file 1550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 16A is a block diagram illustrating both an exemplary in-order pipeline and an exemplary register renaming, out-of-order issue/execution pipeline according to embodiments of the invention. FIG. 16B is a block diagram illustrating both an exemplary embodiment of an in-order architecture core and an exemplary register renaming, out-of-order issue/execution architecture core to be included in a processor according to embodiments of the invention. The solid lined boxes in FIGS. 16A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16A, a processor pipeline 1600 includes a fetch stage 1602, a length decode stage 1604, a decode stage 1606, an allocation stage 1608, a renaming stage 1610, a scheduling (also known as a dispatch or issue) stage 1612, a register read/memory read stage 1614, an execute stage 1616, a write back/memory write stage 1618, an exception handling stage 1622, and a commit stage 1624.

FIG. 16B shows processor core 1690 including a front end unit 1630 coupled to an execution engine unit 1650, and both are coupled to a memory unit 1670. The core 1690 may be a reduced instruction set computing (RISC) core, a complex instruction set computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like.

The front end unit 1630 includes a branch prediction unit 1632 coupled to an instruction cache unit 1634, which is coupled to an instruction translation lookaside buffer (TLB) 1636, which is coupled to an instruction fetch unit 1638, which is coupled to a decode unit 1640. The decode unit 1640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1690 includes a microcode ROM or other medium that stores microcode for certain macroinstructions (e.g., in decode unit 1640 or otherwise within the front end unit 1630). The decode unit 1640 is coupled to a rename/allocator unit 1652 in the execution engine unit 1650.

The execution engine unit 1650 includes the rename/allocator unit 1652 coupled to a retirement unit 1654 and a set of one or more scheduler unit(s) 1656. The scheduler unit(s) 1656 represents any number of different schedulers, including reservations stations, central instruction window, etc. The scheduler unit(s) 1656 is coupled to the physical register file(s) unit(s) 1658. Each of the physical register file(s) units 1658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1658 comprises a vector registers unit, a write mask registers unit, and a scalar registers unit. These register units may provide architectural vector registers, vector mask registers, and general purpose registers. The physical register file(s) unit(s) 1658 is overlapped by the retirement unit 1654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1654 and the physical register file(s) unit(s) 1658 are coupled to the execution cluster(s) 1660. The execution cluster(s) 1660 includes a set of one or more execution units 1662 and a set of one or more memory access units 1664. The execution units 1662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1656, physical register file(s) unit(s) 1658, and execution cluster(s) 1660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1664). It should also be understood that where separate pipelines are used, one or more of these pipelines may be out-of-order issue/execution and the rest in-order.

The set of memory access units 1664 is coupled to the memory unit 1670, which includes a data TLB unit 1672 coupled to a data cache unit 1674 coupled to a level 2 (L2) cache unit 1676. In one exemplary embodiment, the memory access units 1664 may include a load unit, a store address unit, and a store data unit, each of which is coupled to the data TLB unit 1672 in the memory unit 1670. The instruction cache unit 1634 is further coupled to a level 2 (L2) cache unit 1676 in the memory unit 1670. The L2 cache unit 1676 is coupled to one or more other levels of cache and eventually to a main memory.

By way of example, the exemplary register renaming, out-of-order issue/execution core architecture may implement the pipeline 1600 as follows: 1) the instruction fetch 1638 performs the fetch and length decoding stages 1602 and 1604; 2) the decode unit 1640 performs the decode stage 1606; 3) the rename/allocator unit 1652 performs the allocation stage 1608 and renaming stage 1610; 4) the scheduler unit(s) 1656 performs the schedule stage 1612; 5) the physical register file(s) unit(s) 1658 and the memory unit 1670 perform the register read/memory read stage 1614; the execution cluster 1660 perform the execute stage 1616; 6) the memory unit 1670 and the physical register file(s) unit(s) 1658 perform the write back/memory write stage 1618; 7) various units may be involved in the exception handling stage 1622; and 8) the retirement unit 1654 and the physical register file(s) unit(s) 1658 perform the commit stage 1624.

The core 1690 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1634/1674 and a shared L2 cache unit 1676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 17B:
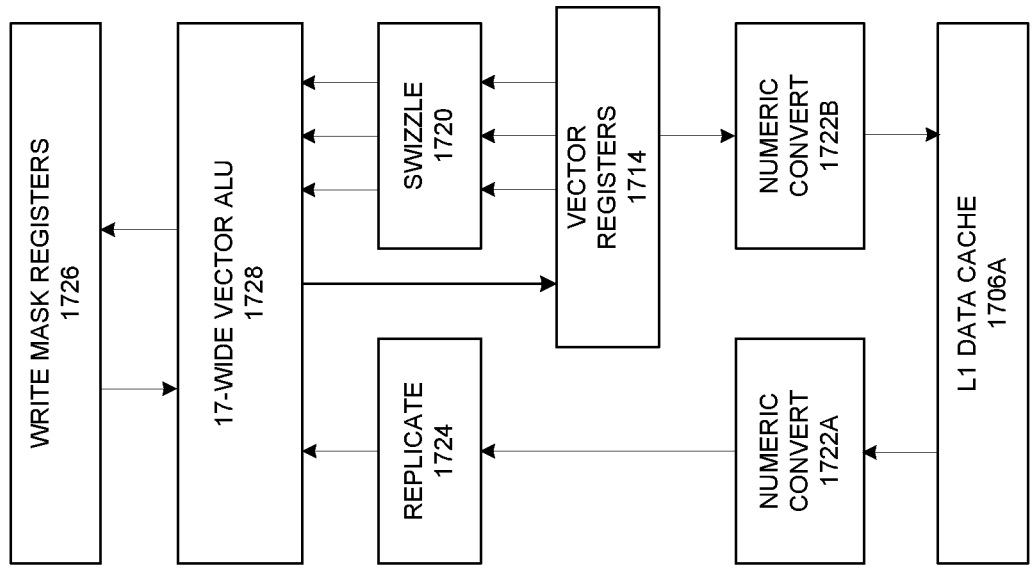
FIG. 17B is a block diagram of an embodiment of an expanded view of part of the processor core of FIG. 17A.
Figure 17A:
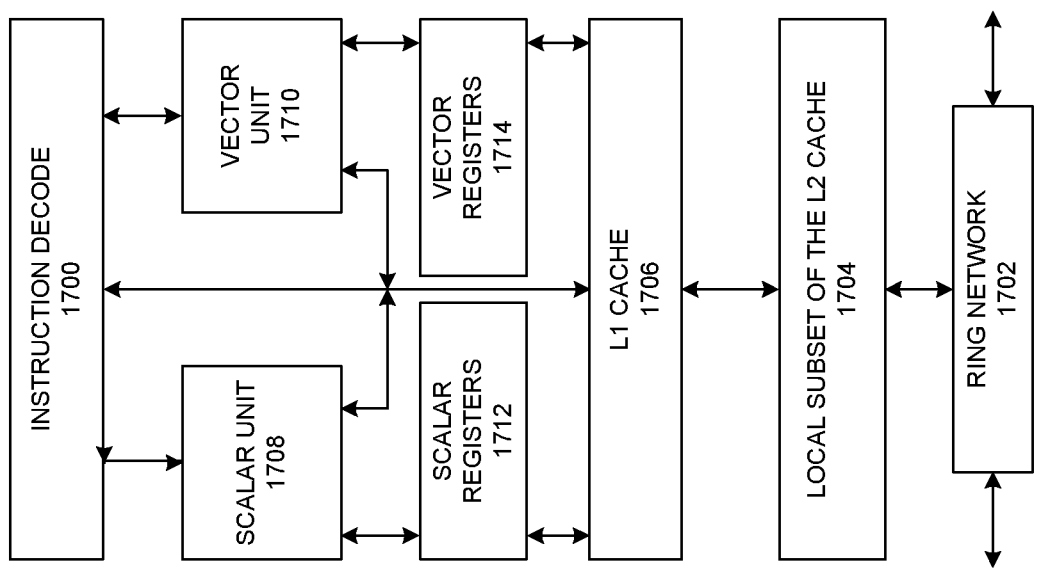
FIG. 17A is a block diagram of an embodiment of a single processor core, along with its connection to the on-die interconnect network, and with its local subset of the Level 2 (L2) cache.

FIGS. 17A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 17A is a block diagram of a single processor core, along with its connection to the on-die interconnect network 1702 and with its local subset of the Level 2 (L2) cache 1704, according to embodiments of the invention. In one embodiment, an instruction decoder 1700 supports the x86 instruction set with a packed data instruction set extension. An L1 cache 1706 allows low-latency accesses to cache memory into the scalar and vector units. While in one embodiment (to simplify the design), a scalar unit 1708 and a vector unit 1710 use separate register sets (respectively, scalar registers 11712 and vector registers 1714) and data transferred between them is written to memory and then read back in from a level 1 (L1) cache 1706, alternative embodiments of the invention may use a different approach (e.g., use a single register set or include a communication path that allow data to be transferred between the two register files without being written and read back).

The local subset of the L2 cache 1704 is part of a global L2 cache that is divided into separate local subsets, one per processor core. Each processor core has a direct access path to its own local subset of the L2 cache 1704. Data read by a processor core is stored in its L2 cache subset 1704 and can be accessed quickly, in parallel with other processor cores accessing their own local L2 cache subsets. Data written by a processor core is stored in its own L2 cache subset 1704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 17B is an expanded view of part of the processor core in FIG. 17A according to embodiments of the invention. FIG. 17B includes an L1 data cache 1706A part of the L1 cache 1704, as well as more detail regarding the vector unit 1710 and the vector registers 1714. Specifically, the vector unit 1710 is a 16-wide vector processing unit (VPU) (see the 16-wide ALU 1728), which executes one or more of integer, single-precision float, and double-precision float instructions. The VPU supports swizzling the register inputs with swizzle unit 1720, numeric conversion with numeric convert units 1722A-B, and replication with replication unit 1724 on the memory input. Write mask registers 1726 allow predicating resulting vector writes.

Processor with Integrated Memory Controller and Graphics

Figure 18:
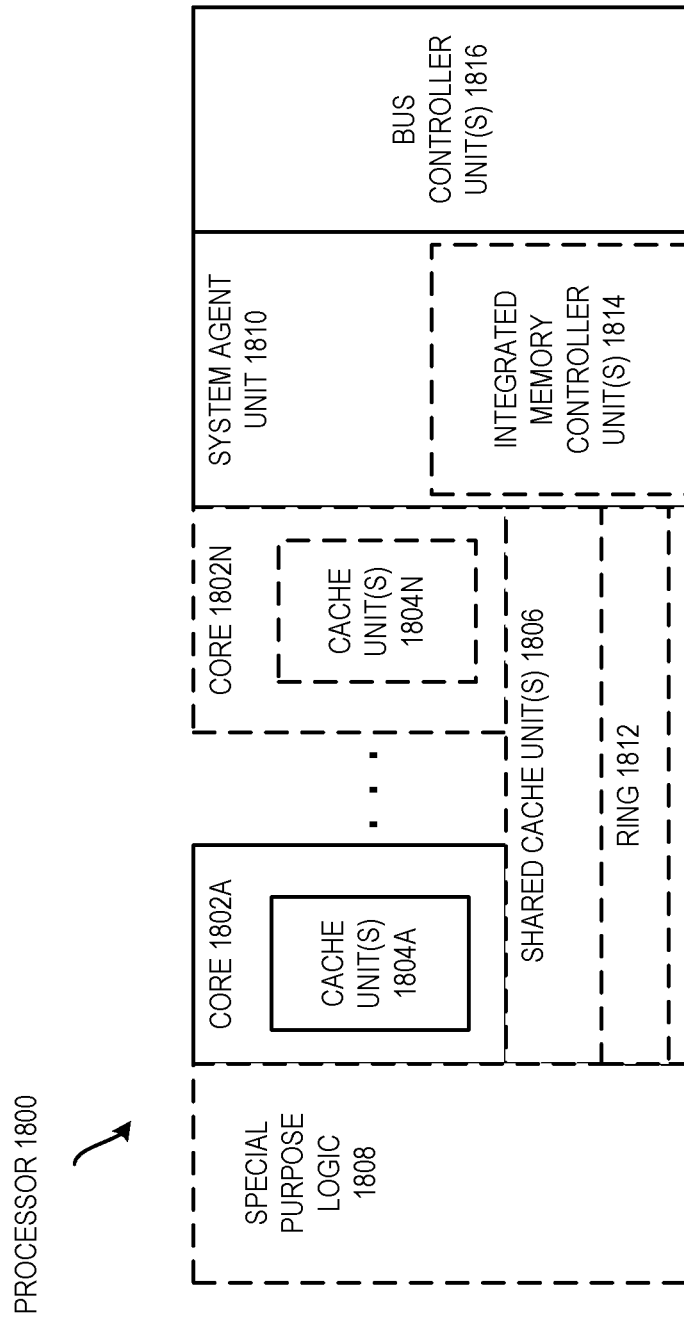
FIG. 18 is a block diagram of an embodiment of a processor that may have more than one core, may have an integrated memory controller, and may have integrated graphics.

FIG. 18 is a block diagram of a processor 1800 that may have more than one core, may have an integrated memory controller, and may have integrated graphics according to embodiments of the invention. The solid lined boxes in FIG. 18 illustrate a processor 1800 with a single core 1802A, a system agent 1810, a set of one or more bus controller units 1816, while the optional addition of the dashed lined boxes illustrates an alternative processor 1800 with multiple cores 1802A-N, a set of one or more integrated memory controller unit(s) 1814 in the system agent unit 1810, and special purpose logic 1808.

Thus, different implementations of the processor 1800 may include: 1) a CPU with the special purpose logic 1808 being integrated graphics and/or scientific (throughput) logic (which may include one or more cores), and the cores 1802A-N being one or more general purpose cores (e.g., general purpose in-order cores, general purpose out-of-order cores, a combination of the two); 2) a coprocessor with the cores 1802A-N being a large number of special purpose cores intended primarily for graphics and/or scientific (throughput); and 3) a coprocessor with the cores 1802A-N being a large number of general purpose in-order cores. Thus, the processor 1800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1806, and external memory (not shown) coupled to the set of integrated memory controller units 1814. The set of shared cache units 1806 may include one or more mid-level caches, such as level 2 (L2), level 3 (L3), level 4 (L4), or other levels of cache, a last level cache (LLC), and/or combinations thereof. While in one embodiment a ring based interconnect unit 1812 interconnects the integrated graphics logic 1808, the set of shared cache units 1806, and the system agent unit 1810/integrated memory controller unit(s) 1814, alternative embodiments may use any number of well-known techniques for interconnecting such units. In one embodiment, coherency is maintained between one or more cache units 1806 and cores 1802-A-N.

In some embodiments, one or more of the cores 1802A-N are capable of multi-threading. The system agent 1810 includes those components coordinating and operating cores 1802A-N. The system agent unit 1810 may include for example a power control unit (PCU) and a display unit. The PCU may be or include logic and components needed for regulating the power state of the cores 1802A-N and the integrated graphics logic 1808. The display unit is for driving one or more externally connected displays.

The cores 1802A-N may be homogenous or heterogeneous in terms of architecture instruction set; that is, two or more of the cores 1802A-N may be capable of execution the same instruction set, while others may be capable of executing only a subset of that instruction set or a different instruction set.

Exemplary Computer Architectures

Figure 19:
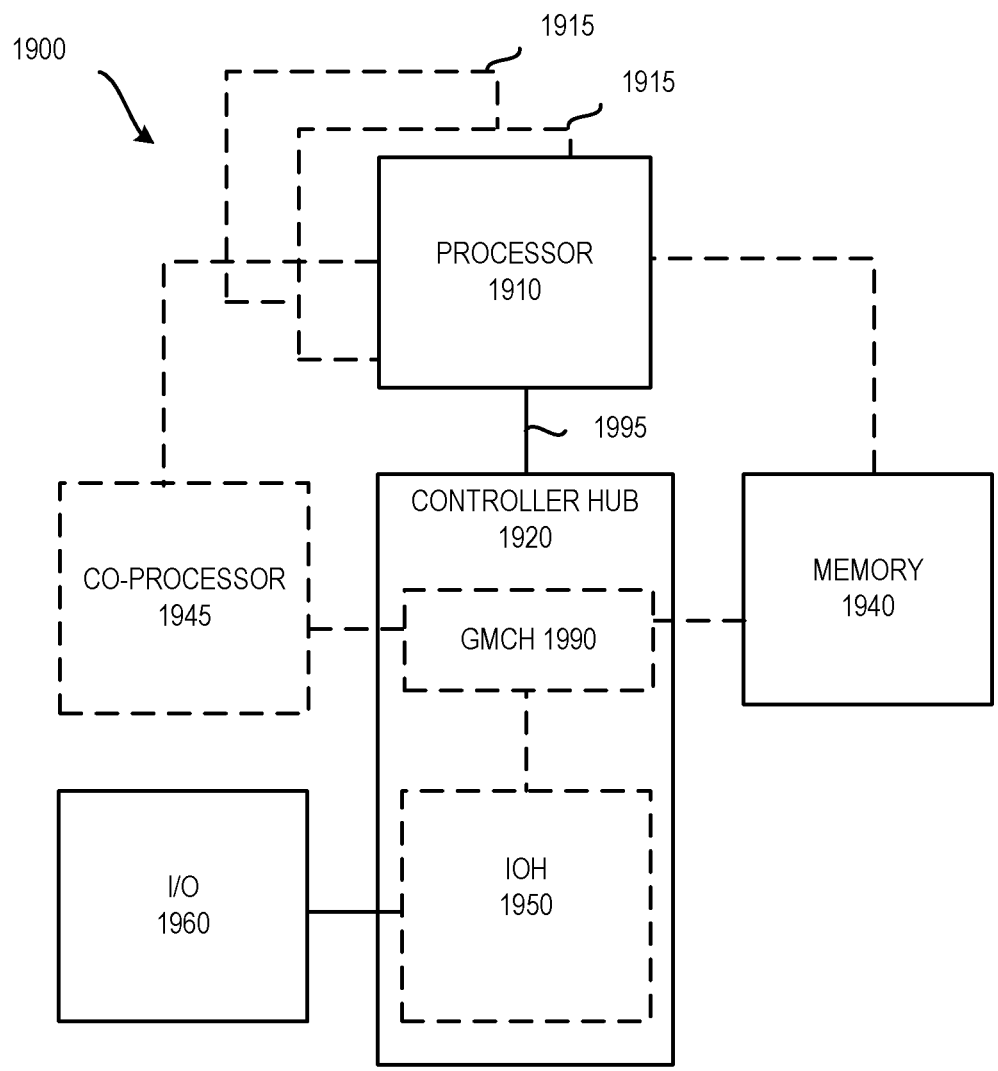
FIG. 19 is a block diagram of a first embodiment of a computer architecture.
Figure 20:
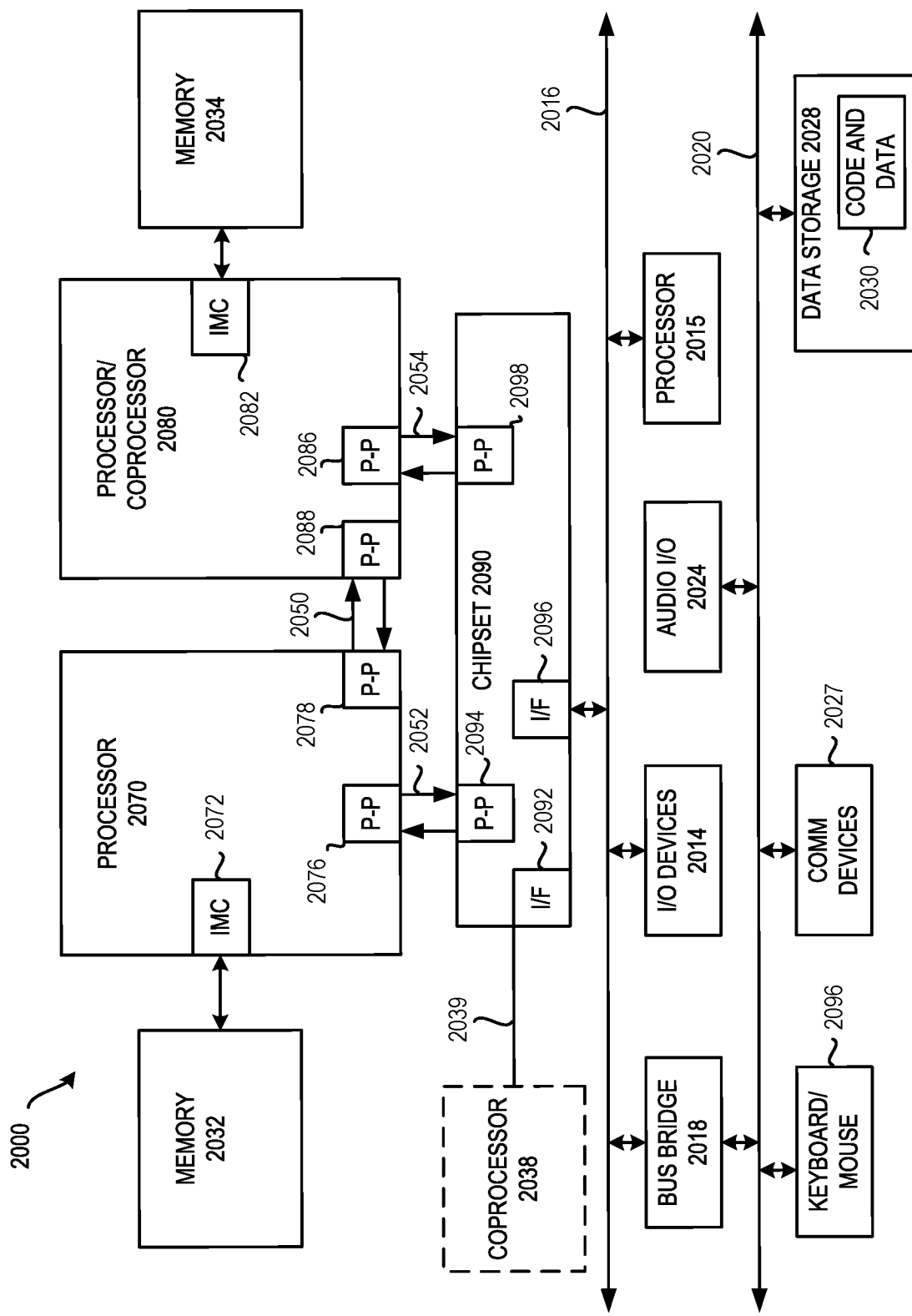
FIG. 20 is a block diagram of a second embodiment of a computer architecture.
Figure 21:
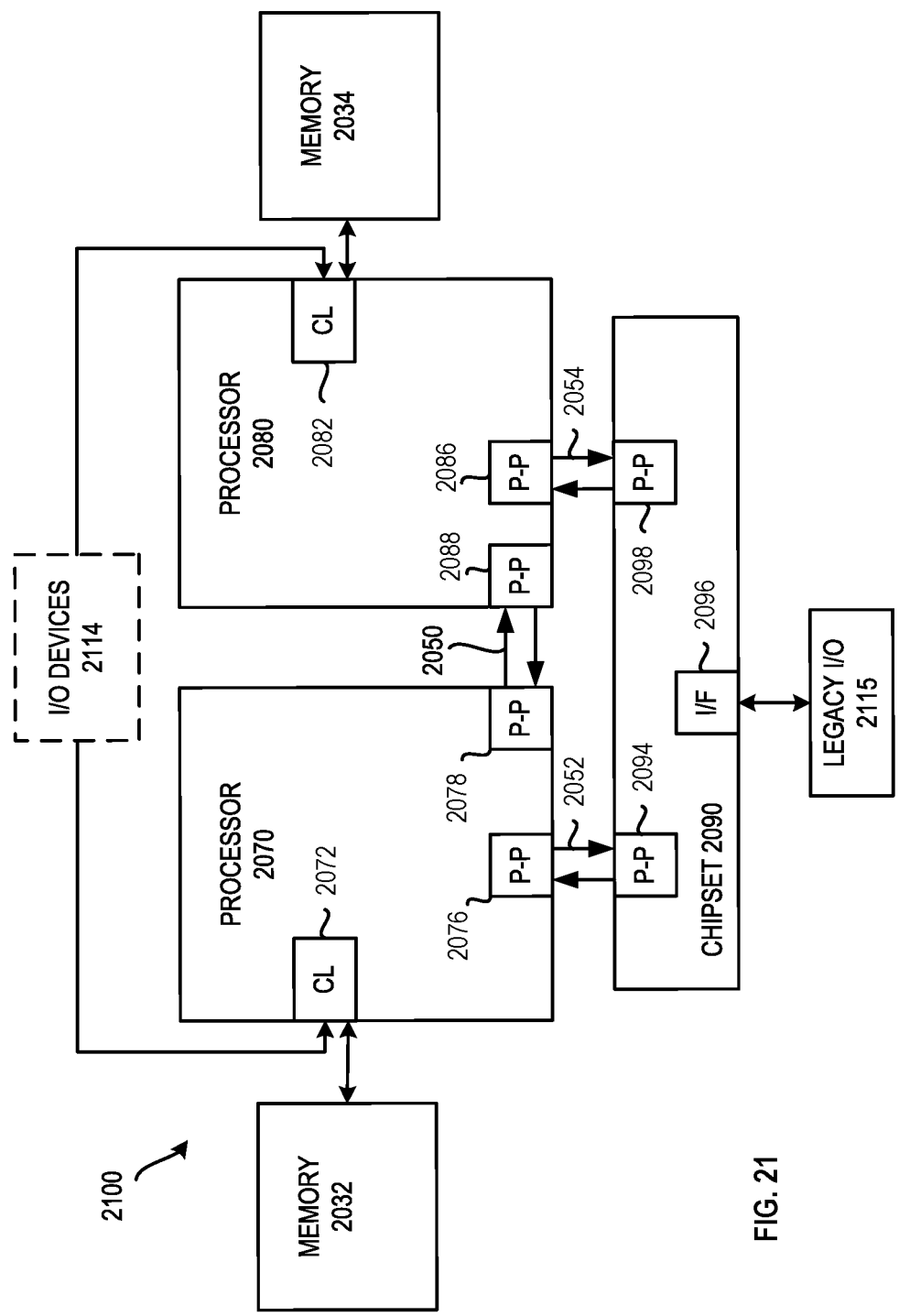
FIG. 21 is a block diagram of a third embodiment of a computer architecture.

FIGS. 19-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 19, shown is a block diagram of a system 1900 in accordance with one embodiment of the present invention. The system 1900 may include one or more processors 1910, 1915, which are coupled to a controller hub 1920. In one embodiment the controller hub 1920 includes a graphics memory controller hub (GMCH) 1990 and an Input/Output Hub (IOH) 1950 (which may be on separate chips); the GMCH 1990 includes memory and graphics controllers to which are coupled memory 1940 and a coprocessor 1945; the IOH 1950 is couples input/output (I/O) devices 1960 to the GMCH 1990. Alternatively, one or both of the memory and graphics controllers are integrated within the processor (as described herein), the memory 1940 and the coprocessor 1945 are coupled directly to the processor 1910, and the controller hub 1920 in a single chip with the IOH 1950.

The optional nature of additional processors 1915 is denoted in FIG. 19 with broken lines. Each processor 1910, 1915 may include one or more of the processing cores described herein and may be some version of the processor 1800.

The memory 1940 may be, for example, dynamic random access memory (DRAM), phase change memory (PCM), or a combination of the two. For at least one embodiment, the controller hub 1920 communicates with the processor(s) 1910, 1915 via a multi-drop bus, such as a frontside bus (FSB), point-to-point interface such as QuickPath Interconnect (QPI), or similar connection 1995.

In one embodiment, the coprocessor 1945 is a special-purpose processor, such as, for example, a high-throughput MIC processor, a network or communication processor, compression engine, graphics processor, GPGPU, embedded processor, or the like. In one embodiment, controller hub 1920 may include an integrated graphics accelerator.

There can be a variety of differences between the physical resources 1910, 1915 in terms of a spectrum of metrics of merit including architectural, microarchitectural, thermal, power consumption characteristics, and the like.

In one embodiment, the processor 1910 executes instructions that control data processing operations of a general type. Embedded within the instructions may be coprocessor instructions. The processor 1910 recognizes these coprocessor instructions as being of a type that should be executed by the attached coprocessor 1945. Accordingly, the processor 1910 issues these coprocessor instructions (or control signals representing coprocessor instructions) on a coprocessor bus or other interconnect, to coprocessor 1945. Coprocessor(s) 1945 accept and execute the received coprocessor instructions.

Referring now to FIG. 20, shown is a block diagram of a first more specific exemplary system 2000 in accordance with an embodiment of the present invention. As shown in FIG. 20, multiprocessor system 2000 is a point-to-point interconnect system, and includes a first processor 2070 and a second processor 2080 coupled via a point-to-point interconnect 2050. Each of processors 2070 and 2080 may be some version of the processor 1800. In one embodiment of the invention, processors 2070 and 2080 are respectively processors 1910 and 1915, while coprocessor 2038 is coprocessor 1945. In another embodiment, processors 2070 and 2080 are respectively processor 1910 coprocessor 1945.

Processors 2070 and 2080 are shown including integrated memory controller (IMC) units 2072 and 2082, respectively. Processor 2070 also includes as part of its bus controller units point-to-point (P-P) interfaces 2076 and 2078; similarly, second processor 2080 includes P-P interfaces 2086 and 2088. Processors 2070, 2080 may exchange information via a point-to-point (P-P) interface 2050 using P-P interface circuits 2078, 2088. As shown in FIG. 20, IMCs 2072 and 2082 couple the processors to respective memories, namely a memory 2032 and a memory 2034, which may be portions of main memory locally attached to the respective processors.

Processors 2070, 2080 may each exchange information with a chipset 2090 via individual P-P interfaces 2052, 2054 using point to point interface circuits 2076, 2094, 2086, 2098. Chipset 2090 may optionally exchange information with the coprocessor 2038 via a high-performance interface 2039. In one embodiment, the coprocessor 2038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2090 may be coupled to a first bus 2016 via an interface 2096. In one embodiment, first bus 2016 may be a Peripheral Component Interconnect (PCI) bus, or a bus such as a PCI Express bus or another third generation I/O interconnect bus, although the scope of the present invention is not so limited.

As shown in FIG. 20, various I/O devices 2014 may be coupled to first bus 2016, along with a bus bridge 2018 which couples first bus 2016 to a second bus 2020. In one embodiment, one or more additional processor(s) 2015, such as coprocessors, high-throughput MIC processors, GPGPU's, accelerators (such as, e.g., graphics accelerators or digital signal processing (DSP) units), field programmable gate arrays, or any other processor, are coupled to first bus 2016. In one embodiment, second bus 2020 may be a low pin count (LPC) bus. Various devices may be coupled to a second bus 2020 including, for example, a keyboard and/or mouse 2022, communication devices 2027 and a storage unit 2028 such as a disk drive or other mass storage device which may include instructions/code and data 2030, in one embodiment. Further, an audio I/O 2024 may be coupled to the second bus 2020. Note that other architectures are possible. For example, instead of the point-to-point architecture of FIG. 20, a system may implement a multi-drop bus or other such architecture.

Referring now to FIG. 21, shown is a block diagram of a second more specific exemplary system 2100 in accordance with an embodiment of the present invention. Like elements in FIGS. 20 and 21 bear like reference numerals, and certain aspects of FIG. 20 have been omitted from FIG. 21 in order to avoid obscuring other aspects of FIG. 21.

FIG. 21 illustrates that the processors 2070, 2080 may include integrated memory and I/O control logic ("CL") 2072 and 2082, respectively. Thus, the CL 2072, 2082 include integrated memory controller units and include I/O control logic. FIG. 21 illustrates that not only are the memories 2032, 2034 coupled to the CL 2072, 2082, but also that I/O devices 2114 are also coupled to the control logic 2072, 2082. Legacy I/O devices 2115 are coupled to the chipset 2090.

Figure 22:
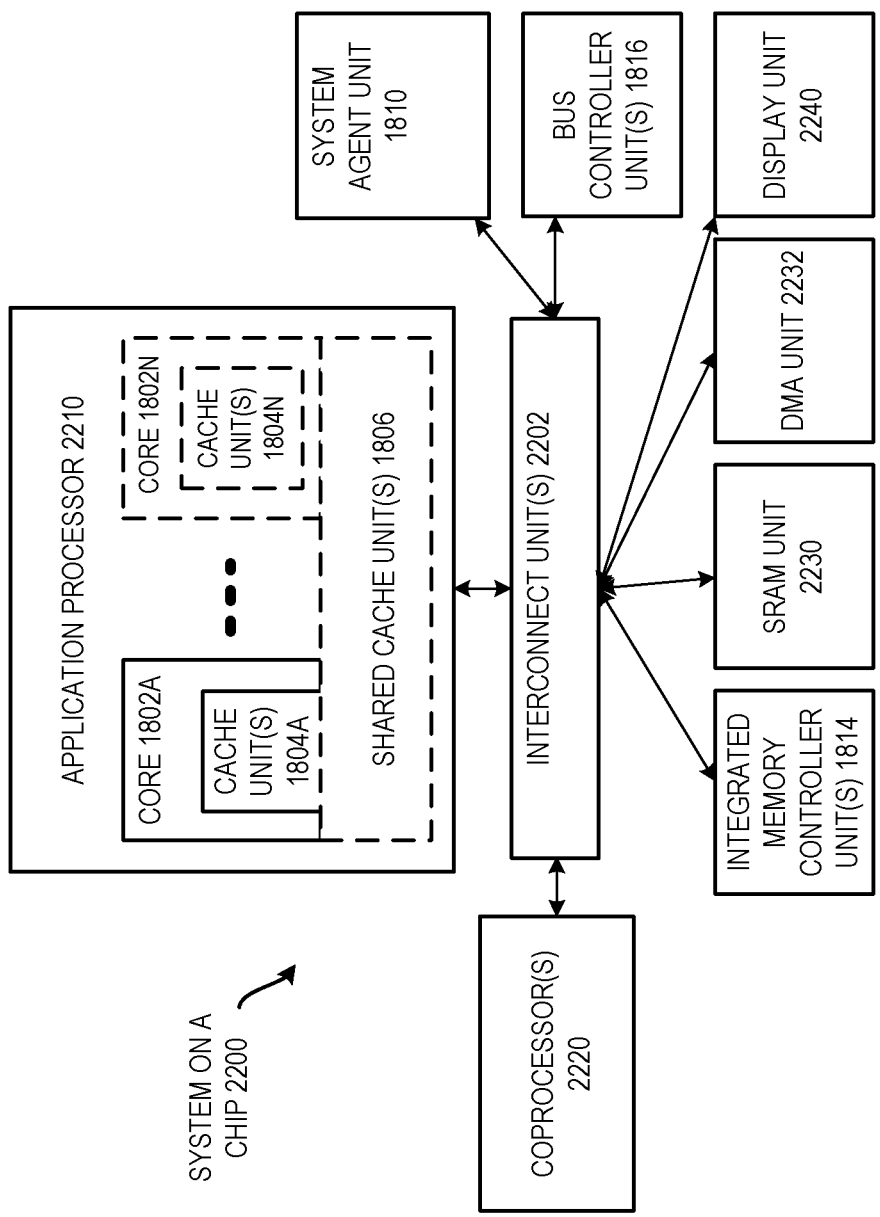
FIG. 22 is a block diagram of a fourth embodiment of a computer architecture.

Referring now to FIG. 22, shown is a block diagram of a SoC 2200 in accordance with an embodiment of the present invention. Similar elements in FIG. 18 bear like reference numerals. Also, dashed lined boxes are optional features on more advanced SoCs. In FIG. 22, an interconnect unit(s) 2202 is coupled to: an application processor 2210 which includes a set of one or more cores 212A-N and shared cache unit(s) 1806; a system agent unit 1810; a bus controller unit(s) 1816; an integrated memory controller unit(s) 1814; a set or one or more coprocessors 2220 which may include integrated graphics logic, an image processor, an audio processor, and a video processor; an static random access memory (SRAM) unit 2230; a direct memory access (DMA) unit 2232; and a display unit 2240 for coupling to one or more external displays. In one embodiment, the coprocessor(s) 2220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2030 illustrated in FIG. 20, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 23:
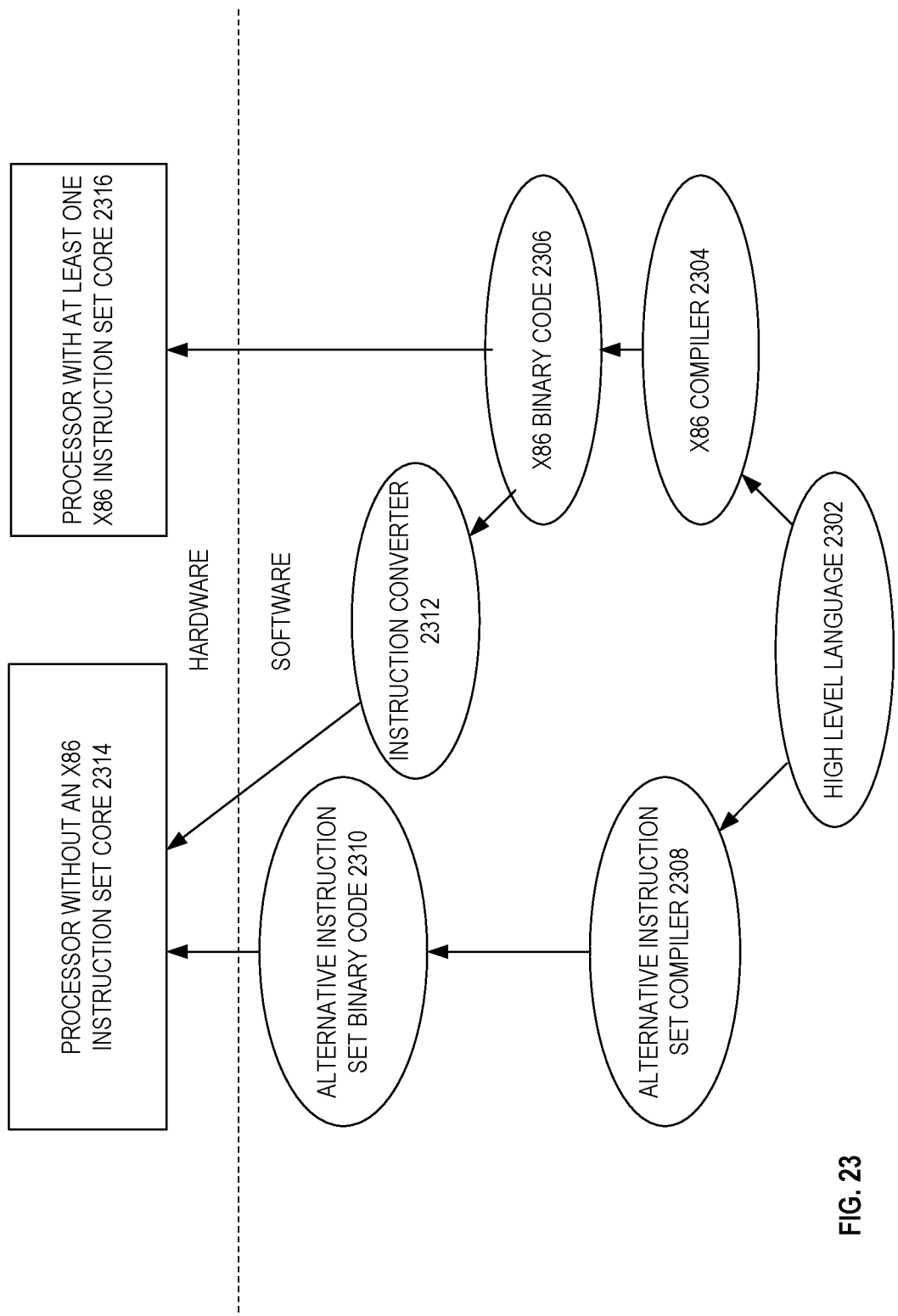
FIG. 23 is a block diagram of use of a software instruction converter to convert binary instructions in a source instruction set to binary instructions in a target instruction set, according to embodiments of the invention.

FIG. 23 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 23 shows a program in a high level language 2302 may be compiled using an x86 compiler 2304 to generate x86 binary code 2306 that may be natively executed by a processor with at least one x86 instruction set core 2316. The processor with at least one x86 instruction set core 2316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2304 represents a compiler that is operable to generate x86 binary code 2306 (e.g., object code) that can, with or without additional linkage processing, be executed on the processor with at least one x86 instruction set core 2316. Similarly, FIG. 23 shows the program in the high level language 2302 may be compiled using an alternative instruction set compiler 2308 to generate alternative instruction set binary code 2310 that may be natively executed by a processor without at least one x86 instruction set core 2314 (e.g., a processor with cores that execute the MIPS instruction set of MIPS Technologies of Sunnyvale, CA and/or that execute the ARM instruction set of ARM Holdings of Sunnyvale, CA). The instruction converter 2312 is used to convert the x86 binary code 2306 into code that may be natively executed by the processor without an x86 instruction set core 2314. This converted code is not likely to be the same as the alternative instruction set binary code 2310 because an instruction converter capable of this is difficult to make; however, the converted code will accomplish the general operation and be made up of instructions from the alternative instruction set. Thus, the instruction converter 2312 represents software, firmware, hardware, or a combination thereof that, through emulation, simulation or any other process, allows a processor or other electronic device that does not have an x86 instruction set processor or core to execute the x86 binary code 2306.

Components, features, and details described for any of FIGS. 4-5 may also optionally apply to any of FIGS. 1, 3, and 6. Components, features, and details described for any of FIGS. 8-10 may also optionally apply to FIG. 7. Moreover, components, features, and details described for any of the apparatus may also optionally apply to any of the methods, which in embodiments may be performed by and/or with such apparatus. Any of the processors described herein may be included in any of the computer systems disclosed herein. In some embodiments, the computer system may include a dynamic random access memory (DRAM). Alternatively, the computer system may include a type of volatile memory that does not need to be refreshed or flash memory. The instructions disclosed herein may be performed with any of the processors shown herein, having any of the microarchitectures shown herein, on any of the systems shown herein. The instructions disclosed herein may have any of the features of the instruction formats shown herein.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with registers and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid matter.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

Example Embodiments

The following examples pertain to further embodiments. Specifics in the examples may be used anywhere in one or more embodiments.

Example 1 is a processor including a decode unit to decode a data element rearrangement instruction. The instruction to indicate a source packed data operand that is to have a plurality of source data elements and to indicate a destination storage location. Each of the source data elements is to have a source data element value and a source data element position relative to a least significant end of the source packed data operand. An execution unit is coupled with the decode unit. The execution unit, in response to the instruction, is to store a result packed data operand in the destination storage location. The result packed data operand is to have a plurality of result data elements that are each to have a result data element value and a result data element position relative to a least significant end of the result packed data operand. The result data element value of each result data element is to be one of: (1) equal to a source data element position of a source data element, closest to one end of the source packed data operand, that is to have a source data element value equal to the result data element position of the result data element; and (2) a replacement value, when no source data element is to have a source data element value equal to the result data element position of the result data element.

Example 2 includes the processor of Example 1, in which the source packed data operand is to have a plurality of sets of duplicate source data element values. For each set of duplicate source data element values the result packed data operand is to store a source data element position of only a most significant one of the duplicate source data element values.

Example 3 includes the processor of Example 1, in which the execution unit, in response to the instruction, is to store the result packed data operand in which said one end of the source packed data operand includes a most significant end of the source packed data operand.

Example 4 includes the processor of Example 1, in which the execution unit, in response to the instruction, is to store the result packed data operand in which said one end of the source packed data operand includes a least significant end of the source packed data operand.

Example 5 includes the processor of Example 1, in which the execution unit, in response to the instruction, is to store a result mask operand that is to have a plurality of mask elements which are each to correspond to a different one of the result data elements.

Example 6 includes the processor of Example 5, in which the execution unit, in response to the instruction, is to store the result mask operand in which: (1) each mask element which is to correspond to a result data element value that is to equal a source data element position is to have a first value; and (2) each mask element which is to correspond to a result data element value that is to be a replacement value is to have a second different value.

Example 7 includes the processor of Example 5, in which each mask element is to comprise only a single bit.

Example 8 includes the processor of Example 5, in which the execution unit, in response to the instruction, is to store the result mask operand in a mask register. A plurality of other instructions of an instruction set, including the data element rearrangement instruction, are to specify the mask register for a predicate operand which is to be used to predicate a packed data operation.

Example 9 includes the processor of Example 1, in which the execution unit, in response to the instruction, is to store the result packed data operand which is to have at least one result data element which is to have a result data element value that is to be a replacement value. The replacement value is to a negative number. No other result data element values, which are not replacement values, are to be negative numbers.

Example 10 includes the processor of Example 1, in which the execution unit, in response to the instruction, is to store the result packed data operand which is to have at least one result data element which is to have a result data element value that is to be a replacement value, and in which the replacement value is to comprise a zero value.

Example 11 includes the processor of Example 1, in which the execution unit, in response to the instruction, is to store the result packed data operand which is to have a result data element value that is to be a replacement value. The replacement value is to comprise a value of a data element stored in a corresponding position in the destination storage location just prior to execution of the instruction.

Example 12 includes the processor of any one of Examples 1 to 11, in which the execution unit, in response to the instruction, is to store the result packed data operand which is to have at least eight result data elements including at least one result data element that is to have as a result data element value the replacement value.

Example 13 includes the processor of any one of Examples 1 to 11, in which each of the source data elements includes an integer index. Each index is represented in a lowest order subset of bits of a least significant byte of each source data element.

Example 14 includes the processor of any one of Examples 1 to 11, in which the decode unit is also to decode a gather by indices to register instruction, but the decode unit is not able to decode a scatter by indices to register instruction.

Example 15 includes the processor of any one of Examples 1 to 11, in which the source packed data operand is to have the source data elements arranged in a scatter pattern, and in which the result packed data operand is to have the result data elements arranged in a gather pattern.

Example 16 is a method in a processor including receiving a data element rearrangement instruction. The instruction indicating a source packed data operand having a plurality of source data elements and indicating a destination storage location. Each of the source data elements has a source data element value and a source data element position relative to a least significant end of the source packed data operand. The method also includes storing a result packed data operand in the destination storage location in response to the instruction. The result packed data operand has a plurality of result data elements that each have a result data element value and a result data element position relative to a least significant end of the result packed data operand. The result data element value of each result data element is one of: (1) equal to a source data element position of a source data element, closest to one end of the source packed data operand, that has a source data element value equal to the result data element position of the result data element; and (2) a replacement value, when no source data element has a source data element value equal to the result data element position of the result data element.

Example 17 includes the method of Example 16, in which the execution unit, in response to the instruction, is to store the result packed data operand in which said one end of the source packed data operand includes a most significant end of the source packed data operand.

Example 18 includes the method of Example 16, in which the execution unit, in response to the instruction, is to store a result mask operand that is to have a plurality of mask elements which are each to correspond to a different one of the result data elements.

Example 19 includes the method of Example 18, in which the execution unit, in response to the instruction, is to store the result mask operand in which: (1) each mask element which is to correspond to a result data element value that is to equal a source data element position is to have a first value; and (2) each mask element which is to correspond to a result data element value that is to be a replacement value is to have a second different value.

Example 20 includes the method of Example 16, in which the execution unit, in response to the instruction, is to store the result packed data operand which is to have at least eight result data elements including at least one result data element that is to have as a result data element value the replacement value. Each of the source data elements includes an integer index, and each index is represented in a lowest order subset of bits of a least significant byte of each source data element.

Example 21 includes the method of Example 16, further including performing a gather by indices to register instruction that indicates as a source packed data operand the result packed data operand of the data element rearrangement instruction.

Example 22 is a computer system including an interconnect, and a processor coupled with the interconnect. The processor is to receive a data element rearrangement instruction. The instruction is to indicate a source packed data operand that is to have a plurality of source data elements and to indicate a destination storage location. Each of the source data elements is to have a source data element value and a source data element position relative to a least significant end of the source packed data operand. The processor, in response to the instruction, is to store a result packed data operand in the destination storage location. The result packed data operand is to have a plurality of result data elements that are each to have a result data element value and a result data element position relative to a least significant end of the result packed data operand. The result data element value of each result data element is to be one of: (1) equal to a source data element position of a source data element, closest to one end of the source packed data operand, that is to have a source data element value equal to the result data element position of the result data element; and (2) a replacement value, when no source data element is to have a source data element value equal to the result data element position of the result data element. The computer system also has a dynamic random access memory (DRAM) coupled with the interconnect. The DRAM stores a set of instructions including a gather by indices to register instruction that is to indicate as a source packed data operand the result packed data operand of the data element rearrangement instruction.

Example 23 includes the computer system of Example 22, in which the processor, in response to the instruction, is to store the result packed data operand in which said one end of the source packed data operand includes a most significant end of the source packed data operand.

Example 24 is an article of manufacture including a non-transitory machine-readable storage medium. The non-transitory machine-readable storage medium stores a data element rearrangement instruction. The data element rearrangement instruction is to indicate a source packed data operand that is to have a plurality of source data elements and to indicate a destination storage location. Each of the source data elements is to have a source data element value and a source data element position relative to a least significant end of the source packed data operand. The data element rearrangement instruction if executed by a machine is to cause the machine to perform operations including store a result packed data operand in the destination storage location. The result packed data operand is to have a plurality of result data elements that are each to have a result data element value and a result data element position relative to a least significant end of the result packed data operand. The result data element value of each result data element is to be one of: (1) equal to a source data element position of a source data element, closest to one end of the source packed data operand, that is to have a source data element value equal to the result data element position of the result data element; and (2) a replacement value, when no source data element is to have a source data element value equal to the result data element position of the result data element.

Example 25 includes the article of manufacture of Example 24, in which the data element rearrangement instruction if executed by the machine is to cause the machine to perform operations including store a mask operand in a mask register, in which the mask operand is to have a single mask bit for each result data element of the result packed data operand.

Example 26 includes the processor of any one of Examples 1 to 11, further including an optional branch prediction unit to predict branches, and an optional instruction prefetch unit, coupled with the branch prediction unit, the instruction prefetch unit to prefetch instructions including the data element rearrangement instruction (or a scatter by indices to register instruction). The processor may also optionally include a optional level 1 (L1) instruction cache coupled with the instruction prefetch unit, the L1 instruction cache to store instructions, an optional L1 data cache to store data, and an optional level 2 (L2) cache to store data and instructions. The processor may also optionally include an instruction fetch unit coupled with the decode unit, the L1 instruction cache, and the L2 cache, to fetch the data element rearrangement instruction (or the scatter by indices to register instruction), in some cases from one of the L1 instruction cache and the L2 cache, and to provide the data element rearrangement instruction (or the scatter by indices to register instruction) to the decode unit. The processor may also optionally include a register rename unit to rename registers, an optional scheduler to schedule one or more operations that have been decoded from the data element rearrangement instruction (or the scatter by indices to register instruction) for execution, and an optional commit unit to commit execution results of the data element rearrangement instruction (or the scatter by indices to register instruction).

Example 27 includes a system-on-chip that includes at least one interconnect, the processor of any one of Examples 1 to 16 coupled with the at least one interconnect, an optional graphics processing unit (GPU) coupled with the at least one interconnect, an optional digital signal processor (DSP) coupled with the at least one interconnect, an optional display controller coupled with the at least one interconnect, an optional memory controller coupled with the at least one interconnect, an optional wireless modem coupled with the at least one interconnect, an optional image signal processor coupled with the at least one interconnect, an optional Universal Serial Bus (USB) 3.0 compatible controller coupled with the at least one interconnect, an optional Bluetooth 4.1 compatible controller coupled with the at least one interconnect, and an optional wireless transceiver controller coupled with the at least one interconnect.

Example 28 is a processor or other apparatus to perform or operative to perform the method of any one of Examples 16 to 21.

Example 29 is a processor or other apparatus that includes means for performing the method of any one of Examples 16 to 21.

Example 30 is an article of manufacture that includes an optionally non-transitory machine-readable medium, which optionally stores or otherwise provides an instruction, which if and/or when executed by a processor, computer system, electronic device, or other machine, is operative to cause the machine to perform the method of any one of Examples 16 to 21.

Example 31 is a processor or other apparatus substantially as described herein.

Example 32 is a processor or other apparatus that is operative to perform any method substantially as described herein.

Example 33 is a processor or other apparatus to perform (e.g., that has components to perform or that is operative to perform) any data element rearrangement (or scatter by indices to register) instruction substantially as described herein.

Example 34 is a computer system or other electronic device that includes a processor having a decode unit to decode instructions of a first instruction set. The processor also has one or more execution units. The electronic device also includes a storage device coupled with the processor. The storage device operative to store a data element rearrangement instruction (or scatter by indices to register instruction), which is to be of a second instruction set. The storage device also to store instructions to convert the data element rearrangement instruction (or the scatter by indices to register instruction) into one or more instructions of the first instruction set. The one or more instructions of the first instruction set, when performed by the processor, are to cause the processor to store a result that would be stored by the data element rearrangement instruction (or the scatter by indices to register instruction).

Example 35 is a processor that includes a plurality of packed data registers and a decode unit to decode a scatter by indices to register instruction. The scatter by indices to register instruction to indicate a source packed data operand that is to have a plurality of source data elements, to indicate a source packed indices operand that is to have a plurality of indices, and to indicate a destination packed data register. Each of the indices is to correspond to a different one of the source data elements in a same relative position. An execution unit is coupled with the plurality of packed data registers and coupled with the decode unit. The execution unit, in response to the scatter by indices to register instruction, to store a result packed data operand in the destination packed data register. The result packed data operand is to include a plurality of result data elements. Each result data element is to have a value of one of the source data elements whose corresponding index is to indicate a data element position of the result data element in the result packed data operand.

What is claimed is:

1. A processor comprising:
a decode unit to decode an instruction, the instruction to indicate a source packed data operand that is to have a plurality of source data elements, to indicate a source packed indices operand that is to have a plurality of indices, and to have at least one field to specify a single destination packed data register, wherein each of the indices is to correspond to a different one of the source data elements in a same relative position, wherein each of the indices is to be represented in a lowest order subset of bits of a least significant byte of an associated data element; and
an execution unit coupled with the decode unit, the execution unit to perform the instruction to store a result packed data operand in the single destination packed data register, the result packed data operand to include a plurality of result data elements, each result data element to have a value of one of the source data elements whose corresponding index specifies a data element position of the result data element in the result packed data operand, wherein the execution unit is only to store result data elements in the single destination packed data register.

2. The processor of claim 1, wherein a given result data element is to have a replacement value when none of the indices indicate a data element position of the given result data element, and wherein the replacement value is to be a zero value.

3. The processor of claim 1, wherein a given result data element is to have a replacement value when none of the indices indicate a data element position of the given result data element, and wherein the replacement value is to be a value stored in the data element position of the given result data element in the destination packed data register immediately prior to execution of the instruction.

4. The processor of claim 1, wherein, when the source packed indices operand has a less significant index and a more significant index that are duplicates of one another, the execution unit is to store a value of a source data element corresponding to the more significant index at a data element position of the result packed data operand indicated by the more significant index.

5. The processor of claim 1, wherein, when the source packed indices operand has a less significant index and a more significant index that are duplicates of one another, the execution unit is to store a value of a source data element corresponding to the less significant index at a data element position of the result packed data operand indicated by the less significant index.

6. The processor of claim 1, wherein the execution unit, as part of performance of the instruction, is to raise an exceptional condition if an index has a value greater than a number of data elements that can be stored in the destination packed data register based on a size of the result data elements.

7. The processor of claim 1, wherein the execution unit includes a full crossbar interconnect.

8. The processor of claim 1, wherein the decode unit is to decode the instruction that is to indicate the source packed data operand that is to have at least 512-bits.

9. The processor of claim 1, wherein the decode unit is to decode the instruction that is to indicate the source packed data operand that is to have the plurality of source data elements that each have a same size selected from any one of at least 8-bits, 16-bits, 32-bits, and 64-bits.

10. The processor of claim 1, wherein the instruction has a field to specify the source packed data operand.

11. The processor of claim 1, wherein the single destination packed data register is implicit to the instruction.

12. A method in a processor comprising:
receiving an instruction, the instruction indicating a source packed data operand having a plurality of source data elements, indicating a source packed indices operand having a plurality of indices, and having at least one field specifying a destination packed data register, each of the indices corresponding to a different one of the source data elements in a same relative position; and
performing the instruction and storing a result packed data operand in the destination packed data register, the result packed data operand including a plurality of result data elements that each have a value of one of the source data elements whose corresponding index specifies a data element position of the result data element in the result packed data operand, and the result packed data operand having a replacement value in a given result data element when none of the indices indicate a data element position of the given result data element, wherein the replacement value is a zero value.

13. The method of claim 12, further comprising:
determining that the source packed indices operand has a less significant index and a more significant index that are duplicates of one another; and
storing a value of a source data element corresponding to the more significant index at a data element position of the result packed data operand indicated by the more significant index.

14. The method of claim 12, further comprising, as part of performing the instruction, raising an exceptional condition if an index of the plurality of indices has a value greater than a number of data elements that can be stored in the destination packed data register based on a size of the result data elements.

15. The method of claim 12, further comprising accessing each of the source packed indices in a lowest order subset of bits of a least significant byte of an associated data element.

16. A computer system comprising:
an interconnect;
a processor coupled with the interconnect, the processor to receive an instruction, the instruction to indicate a source packed data operand that is to have a plurality of source data elements, to indicate a source packed indices operand that is to have a plurality of indices, and to have at least one field to specify a destination packed data register, wherein each of the indices is to correspond to a different one of the source data elements in a same relative position, the processor to perform the instruction to store a result packed data operand in the destination packed data register, the result packed data operand to include a plurality of result data elements that are each to have a value of one of the source data elements whose corresponding index specifies a data element position of the result data element in the result packed data operand, and the result packed data operand to have a replacement value in a given result data element when none of the indices indicate a data element position of the given result data element, wherein the replacement value is a zero value; and
a dynamic random access memory (DRAM) coupled with the interconnect.

17. The computer system of claim 16, wherein a given result data element is to have a replacement value when none of the indices indicate a data element position of the given result data element.

18. The computer system of claim 16, wherein, when the source packed indices operand has a less significant index and a more significant index that are duplicates of one another, the execution unit is to store a value of a source data element corresponding to the more significant index at a data element position of the result packed data operand indicated by the more significant index.

19. A processor comprising:
 a decode unit to decode an instruction, the instruction to have at least one field to specify a source packed data register that is to have a plurality of source data elements, to have at least one field to specify a register that is to store a source packed indices operand that is to have a plurality of indices, and to have a single destination packed data register, wherein each of the indices is to correspond to a different one of the source data elements in a same relative position, wherein each of the indices is to be represented in a lowest order subset of bits of a least significant byte of an associated data element; and
 an execution unit coupled with the decode unit, the execution unit to perform the instruction to store a result packed data operand in the single destination packed data register, the result packed data operand to include a plurality of result data elements, each result data element to have a value of one of the source data elements whose corresponding index indicates a data element position of the result data element in the result packed data operand, wherein the execution unit is only to store result data elements in the single destination packed data register.

20. The processor of claim 19, wherein the single destination packed data register is implicit to the instruction.

* * * * *